(12) United States Patent
Mihara et al.

(10) Patent No.: US 7,169,882 B2
(45) Date of Patent: Jan. 30, 2007

(54) MOLDING RESIN AND PROCESS FOR PRODUCTION THEREOF

(75) Inventors: Takashi Mihara, Izumiotsu (JP); Shouji Imamura, Sakura (JP); Masao Kamikura, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/508,954

(22) PCT Filed: Aug. 19, 2003

(86) PCT No.: PCT/JP03/10451

§ 371 (c)(1),
(2), (4) Date: Oct. 4, 2004

(87) PCT Pub. No.: WO2004/018540

PCT Pub. Date: Mar. 4, 2004

(65) Prior Publication Data

US 2006/0030690 A1    Feb. 9, 2006

(30) Foreign Application Priority Data

Aug. 21, 2002  (JP) .............................. 2002-240514

(51) Int. Cl.
*C08G 63/00* (2006.01)

(52) U.S. Cl. .................. 528/272; 264/176.1; 264/219; 525/466; 528/271; 528/354

(58) Field of Classification Search ............. 264/176.1, 264/219; 525/466; 528/271, 272, 354
See application file for complete search history.

(56) References Cited

U.S. PATENT DOCUMENTS 5,403,897 A    4/1995 Ebato et al.
5,686,540 A    11/1997 Kakizawa
6,310,112 B1 *  10/2001 Vo et al. ...................... 521/134
6,756,331 B2 *  6/2004 Kasemura et al. .......... 442/327

FOREIGN PATENT DOCUMENTS

| EP | 0515203 | * | 8/1993 |
| EP | 0712880 |  | 5/1996 |
| EP | 0748846 | * | 2/1997 |
| JP | 2000-344877 |  | 12/2000 |
| JP | 2001-335623 |  | 12/2001 |
| JP | 2002-97350 |  | 4/2002 |
| WO | WO02/06400 |  | 1/2002 |

OTHER PUBLICATIONS

European Search Report dated Feb. 9, 2005.
A.J. Domb; "Degradable Polymer Blends. I. Screening of Miscible Polymers"; *Journal of Polymer Science: Part A: Polymer Chemistry*; vol. 31; 1993; pp. 1973-1981./Discussed in the specification.
D.R. Paul, et al.; "Polymer Blends"; *vol. 1; Academic Press*; 1978; Title pages and Table of Contents (3 Sheets) and pp. 44-53./Discussed in the specification.
Copies of English version and Chinese version of Chinese Patent Office Action for corresponding Chinese patent application No. 03809476.2, dated Feb. 24, 2006, (Citing the reference AF).

* cited by examiner

*Primary Examiner*—Terressa Boykin
(74) *Attorney, Agent, or Firm*—Armstrong, Kratz, Quintos, Hanson & Brooks, LLP

(57) ABSTRACT

A molding resin formed from a block copolymer comprising polyhydroxycarboxylic acid structural units (I), and polyester structural units (II) derived from a dicarboxylic acid and a diol; wherein the weight ratio (I)/(II) between the polyhydroxycarboxylic acid structural units (I) and the polyester structural units (II) is within a range from 95/5 to 10/90; the resin has a microphase separated structure in which either the polyhydroxycarboxylic acid structural units (I) or the polyester structural units (II) forms domains within a matrix formed by the other structural units; the average domain size of the domains is within a range from 0.08 to 5.0 μm; and the weight average molecular weight of the molding resin is within a range from 10,000 to 400,000.

6 Claims, 7 Drawing Sheets

MOLDING RESIN AND PROCESS FOR PRODUCTION THEREOF

TECHNICAL FIELD

The present invention relates to a molding resin that shows excellent flexibility, transparency, impact resistance and biodegradability, which is particularly useful as a resin for molding purposes, as well as a production process for such a resin, and a polyester composition comprising a molding resin and polylactic acid formed using such a molding resin.

BACKGROUND ART

Polyhydroxycarboxylic acids such as polylactic acid show excellent properties of heat resistance, molten moldability, toughness and rigidity. Of such materials, polylactic acid is synthesized from natural raw materials such as corn, and because it shows superior levels of transparency and biodegradability, it is attracting considerable attention as an environmentally friendly resin, and particularly as a resin for molding purposes. However, because it shows poor impact resistance and flexibility, and is brittle, industrial applications thereof are limited.

Techniques aimed at improving these shortcomings include techniques involving forming blends of polylactic acid with other resins or the like, or forming copolymers from polylactic acid and other resins or the like, and techniques in which a plasticizer is added to the polylactic acid.

One example of a process for forming blends of polylactic acid and other resins or the like is a process in which polylactic acid an aliphatic polyester produced from a diol and a dicarboxylic acid and a polycaprolactone, are subjected to molten blending (for example, see non-patent reference 1). However, in this process, in order to achieve satisfactory levels of properties such as impact resistance or flexibility, the quantities added of the other resins must be considerably large. As a result, the inherent transparency and heat resistance of the polylactic acid can't be kept, and because the compatibility with the polylactic acid is poor, problems such as bleeding can arise.

Furthermore, one example of a known process for producing a copolymer of polylactic acid and another resin or the like is a production process in which a lactide, which is the cyclic dimer of lactic acid, and an aliphatic polyester produced from a diol and a dicarboxylic acid are subjected to a ring-opening copolymerization in the presence of a catalyst (for example, see patent reference 1). However, the thus obtained copolymer is not entirely satisfactory and suffers from bleeding of the aliphatic polyester component.

On the basis of further investigations into the above processes for forming copolymers from polylactic acid and other resins or the like, the inventors of the present invention discovered that a lactic acid based copolymer produced by copolymerizing an aliphatic polyester, obtained by reacting a diol of 20 to 45 carbon atoms, and a dicarboxylic acid of 20 to 45 carbon atoms and/or 1,4-cyclohexanedicarboxylic acid, with a lactide in the presence of a ring-opening polymerization catalyst showed excellent transparency and good resistance to bleeding, and was useful as a packaging material or a molding material (for example, see patent reference 2). In addition, they also discovered that adding the above copolymer to polylactic acid yielded an impact resistance imparting agent that improved the impact resistance of the polylactic acid (for example, see patent reference 3), although in both these cases, depending on the intended application, satisfactory levels of impact resistance and flexibility were not always able to be obtained.

On the other hand, production processes have also been disclosed which do not use cyclic dimers such as lactides, but rather subject a polyhydroxycarboxylic acid and an aliphatic polyester to direct or indirect copolymerization (for example, see patent reference 4). In this production process, a polyhydroxycarboxylic acid, a polyester, a molecular weight increasing agent, and where necessary a chelating agent and/or an acidic phosphate ester are all combined, and by subjecting the mixture to molten mixing under reduced pressure while residual volatile matter is removed, a polyhydroxycarboxylic acid copolymer composition of increased molecular weight can be produced within a short time period.

More specific production processes include a process in which a polyhydroxycarboxylic acid such as polylactic acid, a polyester obtained by reacting a dicarboxylic acid and a diol, and a molecular weight increasing agent are mixed together to effect an increase in molecular weight, and a process in which a molecular weight increasing agent and a polyester obtained by reacting a dicarboxylic acid and a diol are first mixed together in advance to effect an increase in molecular weight, and a polyhydroxycarboxylic acid is then mixed in afterwards, either in the presence of, or in the absence of, a transesterification catalyst.

In the case of the former process, although the product depends on the type of molecular weight increasing agent used, and the point at which the chelating agent and/or acidic phosphate ester is added, if the chelating agent and/or acidic phosphate ester is added at the same time as the polyhydroxycarboxylic acid, the polyester, and the molecular weight increasing agent, then for example in the case where an organometallic material such as a tin or titanium based organometallic material is used as the molecular weight increasing agent, the organometallic material and the chelating agent and/or acidic phosphate ester undergo chelation, causing a deactivation of the organometallic material and a loss in the effect achieved by adding the molecular weight increasing agent.

Furthermore, if the polyhydroxycarboxylic acid, the polyester, and the molecular weight increasing agent are first mixed together, and the chelating agent and/or acidic phosphate ester is added afterwards, then when the polyhydroxycarboxylic acid and the polyester formed from the dicarboxylic acid and the diol are melted, the action of the residual esterification catalyst left over from the production of the polyester causes a depolymerization of the polyhydroxycarbokylic acid, causing problems such as coloring of the product polyhydroxycarboxylic acid copolymer composition, and difficulty in achieving a stable molecular weight. For example, in those cases where an organometallic material, and particularly a tin based organometallic material, is used as the molecular weight increasing agent, the depolymerization of the polyhydroxycarboxylic acid appears to be further accelerated.

Similarly, in the case of the latter of the production processes described above, the action of residual esterification catalyst, left over from the production of the polyester by the reaction between the dicarboxylic acid and the diol, causes problems such as depolymerization of the polyhydroxycarboxylic acid, and an increased likelihood of gelling.

Furthermore, other problems include an inability to produce a polyhydroxycarboxylic acid copolymer composition within a short time period, instability in the quality of the product due to a difficulty in determining the end point of the reaction, and the presence of unreacted raw material in the product, which can bleeding during production of sheets or films for example, meaning the polyhydroxycarboxylic acid copolymer compositions produced using the production processes described above still require considerable improvement.

As described above, conventional techniques have been unable to impart a practical level of impact resistance and flexibility to a polyhydroxycarboxylic acid while retaining a superior level of transparency.

(Non-patent Reference 1)
A. J. Domb, J. Polym. Sci., Polym. Chem. Ed. 31, 1973 (1993)
(Patent Reference 1)
U.S. Pat. No. 5,403,897
(Patent Reference 2)
Japanese Unexamined Patent Application, First Publication No. 2000-344877
(Patent Reference 3)
Japanese Unexamined Patent Application, First Publication No. 2001-335623
(Patent Reference 4)
U.S. Pat. No. 5,686,540

DISCLOSURE OF INVENTION

A first object that the present invention aims to achieve is to provide a molding resin that shows excellent flexibility, impact resistance and biodegradability, as well as excellent transparency.

Furthermore, a second object that the present invention aims to achieve is to provide a production process for a molding resin, which enables the molding resin with the excellent properties described above to be produced in a stable manner.

Furthermore, a third object that the present invention aims to achieve is to provide a molding resin which is capable of imparting excellent flexibility and impact resistance to polylactic acid, without causing any loss in the inherent transparency of the polylactic acid, and to provide a polyester composition that shows excellent flexibility, impact resistance, and biodegradability, as well as superior transparency.

During the course of intensive research aimed at achieving the above objects, the inventors of the present invention reached the conclusion that the flexibility, impact resistance, biodegradability and transparency of a molding resin are affected significantly by the production process used for producing the molding resin, and the morphology (form) of the product molding resin.

In other words, a lactic acid based copolymer produced according to one of the conventional techniques described above, by polymerizing a cyclic dimer such as a lactide, and an aliphatic polyester obtained by reacting a diol and a dicarboxylic acid, in the presence of a catalyst adopts a microphase separated structure in which polylactic acid structural units and polyester structural units are dispersed at the nano level, and it is thought that because the domain size of the polyester structure blocks, which impart impact absorption properties, are extremely small being at the nano level, the impact resistance is inferior. Similarly, satisfactory impact resistance is not achieved when the above lactic acid based copolymer is added to polylactic acid, and it is surmised that this observation is a result of the same phenomenon, namely the fact that the product adopts a microphase separated structure in which polylactic acid structural units and polyester structural units are dispersed at the nano level.

From these findings it was surmised that in a process for producing a copolymer of polylactic acid and another resin or the like, in order to ensure the desired levels of transparency, impact resistance and flexibility within the product copolymer, determining the optimum and uniform domain size is extremely important.

As a result of further research, the inventors discovered that a molding resin formed from a block copolymer comprising polyhydroxycarboxylic acid structural units (I), and polyester structural units (II) derived from a dicarboxylic acid and a diol, wherein the resin has a microphase separated structure in which one of either the polyhydroxycarboxylic acid structural units (I) or the polyester structural units (II) forms domains within a matrix formed by the other structural units, and the average domain size of the domains is within a range from 0.08 to 5.0 µm is able to satisfy all of the above objects of the present invention.

In addition, the inventors also discovered that the specific microphase separated structure described above that is a prerequisite for achieving the desired levels of transparency, impact resistance and flexibility shows a correlation with certain rheology characteristics.

In other words, using a rotational rheometer, under measurement conditions including a frequency of 1 Hz and a temperature within a range from the melting point of the molding resin through to the melting point +50° C., when the strain of the resin is varied from 1 through to 60%, the strain dependency of the storage elastic modulus G' should be preferably as small as possible, and it was found that in those cases where the storage elastic modulus G'(M%) at a strain of M% ($1<M\leq60$) is from 90 to 100% of the value of the storage elastic modulus G'(1%) at a strain of 1%, the transparency, impact resistance and flexibility of the molding resin are excellent.

A small strain dependency for the storage elastic modulus G' means that when the strain is varied, the molding resin being measured shows an excellent restoring force relative to that strain. It is surmised that this phenomenon is dependent on the specific microstructure within the molding resin, and is also related to the level of transparency, impact resistance and flexibility achieved by the molding resin, although the specifics of this relationship remain unclear.

Furthermore, it is thought that the strain dependency of the storage elastic modulus G' is related to the microphase separated structure of the molding resin. The inventors discovered that this is also related to the degree of progression of the esterification reaction between the polyhydroxycarboxylic acid and the polyester obtained from reacting a dicarboxylic acid and a diol, during the production of the molding resin.

In addition, the inventors also discovered that during the production of the molding resin, monitoring the strain dependency of the storage elastic modulus G' is extremely useful in determining the end point of the esterification reaction between the polyhydroxycarboxylic acid and the polyester obtained from reacting the dicarboxylic acid and the diol, and enables the production of a molding resin with the specific microphase separated structure described above, and excellent levels of transparency, impact resistance and flexibility.

The inventors of the present invention then discovered that during the production of a molding resin by an esterification reaction between a polyhydroxydicarboxylic acid (A), and a polyester (B) with hydroxyl groups at both terminals obtained by reacting a dicarboxylic acid and a diol, by first deactivating the polymerization catalyst used during the production of the polyhydroxydicarboxylic acid (A), and deactivating the polymerization catalyst, namely the esterification catalyst, used during the production of the polyester (B), subsequently mixing together and melting the polyhydroxycarboxylic acid (A) and the polyester (B), and then adding an esterification catalyst and conducting an esterification reaction under conditions of reduced pressure, a product with excellent transparency, impact resistance and flexibility and the like could be produced, and they were thus able to complete the present invention.

In other words, the present invention provides a molding resin formed from a block copolymer comprising polyhydroxycarboxylic acid structural units (I), and polyester structural units (II) derived from a dicarboxylic acid and a diol, wherein the weight ratio (I)/(II) between the polyhydroxycarboxylic acid structural units (I) and the polyester structural units (II) is within a range from 95/5 to 10/90, the resin has a microphase separated structure in which one of either the polyhydroxycarboxylic acid structural units (I) or the polyester structural units (II) forms domains within a matrix formed by the other structural units, the average domain size of the domains is within a range from 0.08 to 5.0 μm, and the weight average molecular weight of the molding resin is within a range from 10,000 to 400,000.

When this molding resin is tested using a rotational rheometer, under measurement conditions including a frequency of 1 Hz and a temperature within a range from the melting point of the molding resin through to the melting point +50° C., then when the strain of the resin is varied from 1 through to 60%, the storage elastic modulus G'(M%) at a strain of M% ($1 < M \leq 60$) is preferably within a range from 90 to 100% of the value of the storage elastic modulus G'(1%) at a strain of 1%.

Furthermore, the present invention also provides a polyester composition comprising a molding resin described above and polylactic acid.

In addition, the present invention also provides a production process for an aforementioned molding resin, wherein a molten mixture of a polyhydroxycarboxylic acid (A) with a weight average molecular weight of 10,000 to 400,000, and a polyester (B) with hydroxyl groups at both terminals and with a weight average molecular weight of 10,000 to 200,000, obtained by reacting a dicarboxylic acid and a diol, is subjected to an esterification reaction in the presence of an esterification catalyst (C) and under conditions of reduced pressure, and the esterification reaction is continued until the point where testing of the reaction product, using a rotational rheometer, under measurement conditions including a frequency of 1 Hz and a temperature within a range from the melting point of the molding resin through to the melting point +50° C., and when the strain of the resin is varied from 1 through to 60%, results in a storage elastic modulus G'(M%) at a strain of M% ($1 < M \leq 60$) that is within a range from 90 to 100% of the value of the storage elastic modulus G'(1%) at a strain of 1%.

BEST MODE FOR CARRYING OUT THE INVENTION

Figure 1:
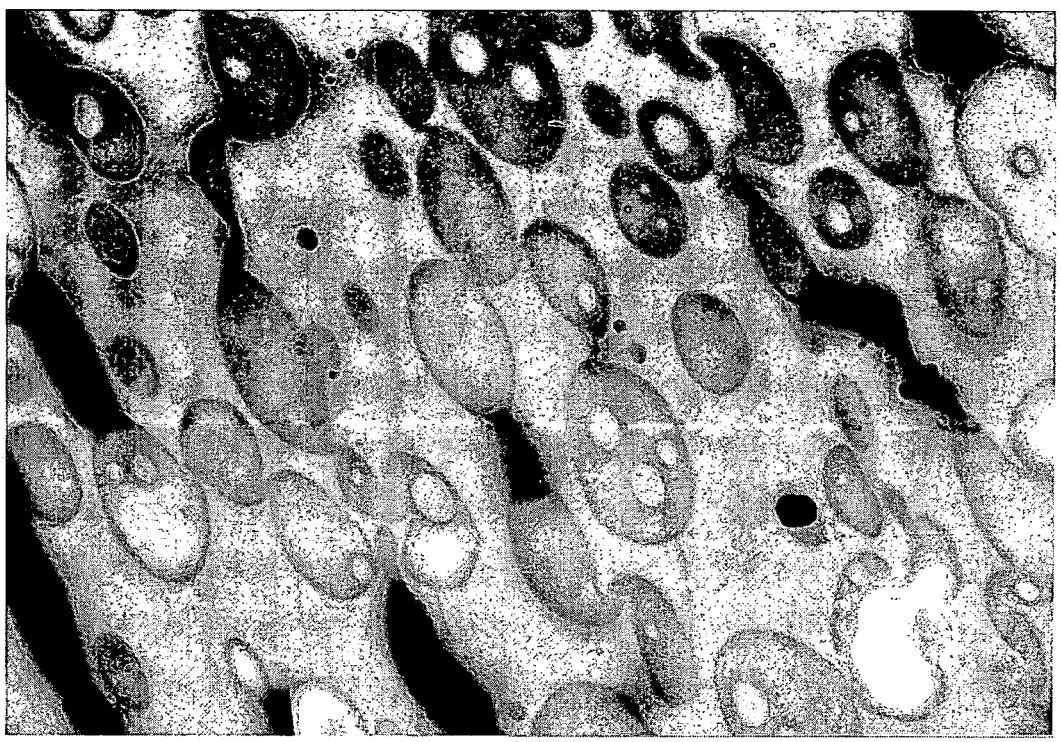
FIG. 1 is a TEM photograph of a film of a molding resin (C-1) obtained in an example 1, in a reference example 8. The black sections in the TEM photograph (FIG. 1) show polyester structural units with hydroxyl groups at both terminals, and the white sections show polyhydroxycarboxylic acid structural units.

First is a detailed description of a molding resin of the present invention. A molding resin of the present invention is a block copolymer comprising polyhydroxycarboxylic acid structural units (I), and polyester structural units (II) derived from a dicarboxylic acid and a diol.

More specifically, if the polyhydroxycarboxylic acid structural units (I) are termed X and the polyester structural units (II) derived from a dicarboxylic acid and a diol are termed Y, then the possible forms of the block copolymer of the molding resin of the present invention include XY type block copolymers, XYX type block copolymers, random block copolymers, and mixtures of these different types, and the actual form will vary depending on the ratio of the raw materials used during the production of the molding resin, and the molecular weights of those raw materials. Furthermore, the molding resin may also contain the polyhydroxycarboxylic acid (A) and the polyester (B) described below as unreacted residues, provided the inclusion of these residues does not impair the characteristics of the molding resin.

The weight ratio (I)/(II) between the polyhydroxycarboxylic acid structural units (I) and the polyester structural units (II) is within a range from 95/5 to 10/90. In those cases where the molding resin is then added to polylactic acid (E), the weight ratio (I)/(II) is preferably within a range from 20/80 to 70/30 in order to improve the co-solubility between the polylactic acid (E) and the molding resin, and is even more preferably within a range from 30/70 to 60/40 in order to impart a favorable level of impact resistance to the polylactic acid (E).

The molding resin of the present invention has a microphase separated structure in which one of either the polyhydroxycarboxylic acid structural units (I) or the polyester structural units (II) forms domains within a matrix formed by the other structural units, and the average domain size of these domains is within a range from 0.08 to 5.0 μm.

By ensuring a domain size within the above range, a molding resin and a polyester composition of the present invention can be imparted with a level of flexibility and impact resistance that is not achievable using conventional techniques, and moreover, the excellent transparency provided by the polyhydroxycarboxylic acid is also retained.

The microphase separated structure described above means the molding resin of the present invention can be broadly classified into one of three configurations. The specific configuration is determined on the basis of the compositional ratio (the weight ratio) between the polyhydroxycarboxylic acid structural units (I) and the polyester structural units (II), or more specifically the volumetric ratio between the polyhydroxycarboxylic acid structural units (I) and the polyester structural units (II).

The first configuration represents a molding resin in which a sea and islands type phase separation occurs with the polyhydroxycarboxylic acid structural units (I) representing the sea phase and the polyester structural units (II) representing the islands phase; the second configuration represents a molding resin in which the polyhydroxycarboxylic acid structural units (I) represent the sea phase, the polyester structural units (II) represent an islands phase, and then the polyhydroxycarboxylic acid structural units (I) exist as a further islands phase within the islands of the polyester structural units (II); and the third configuration represents a molding resin in which the polyhydroxycarboxylic acid structural units (I) represent the islands phase, and the polyester structural units (II) represent the sea phase.

The average domain size of the islands phase in a molding resin of the present invention is preferably within a range from 0.08 to 5.0 µm, and even more preferably from 0.1 to 4.0 µm, and most preferably from 0.1 to 3.5 µm. In this description, the average domain size of the islands phase refers to the average value of the size of the fine island-like particles dispersed within the matrix.

If the average domain size of the islands exceeds 5.0 µm, then the transparency of the molding resin deteriorates markedly, and if the molding resin is then added to polylactic acid (E), a sheet formed from the resulting polyester composition shows inadequate impact resistance, and an inferior external appearance, with both transparency and bleeding problems. It is thought that the greater difficulty associated with achieving a uniform dispersion of the molding resin within the polyester composition is the cause of these problems.

If the molding resin is produced using a process different from the production process of the present invention described below, and the polyhydroxycarboxylic acid and the polyester exist in a configuration that is close to a blend-type configuration, then the average domain size of the islands is prone to exceeding 5 µm.

Furthermore, if the average domain size of the islands is less than 0.08 µm, then characteristics such as the impact resistance tend to deteriorate. Particularly in the case of impact resistance, if the average domain size of the islands, which impart considerable impact absorption, is too small, then achieving a satisfactory level of impact resistance is impossible.

For example, one known alternative molding resin production process to the production process of the present invention is the process described above, in which a lactone such as lactide and a polyester (B) are subjected to copolymerization in the presence of a ring opening polymerization catalyst, but if this process is employed, the average domain size of the islands is frequently less than 0.08 µm.

Depending on the compositional ratio between the lactone and the polyester, structures other than the sea and islands type configuration may also be formed, for example, a configuration in which the lactone structural units and the polyester structural units form alternate layers (a layered structure), and in these cases, characteristics such as the impact resistance and the flexibility are inadequate.

In a production process for a molding resin according to the present invention, the average domain size of the above islands phase falls within a range from 0.08 to 5.0 µm.

In the case of the layered structure described above, or in cases where the average domain size of the islands phase is less than 0.08 µm, when the resin is used to impart impact resistance to polylactic acid (E) in the manner described below, much larger quantities must be added than for a molding resin of the present invention, and in the case of molding resins in which the average domain size of the islands phase is less than 0.08 µm, achieving a significant improvement in physical properties through the addition of a small quantity of resin is impossible.

The morphology of molding resins and polyester compositions of the present invention can be observed using a transmission electron microscope (hereafter abbreviated as TEM. A suitable example is JEM-200CX manufactured by JEOL Datum Ltd.), following completion of an observation pre-treatment.

In one example of TEM observation method, the molding resin and the polyester composition are converted to test specimens comprising films of thickness 200 µm, which are then cut to an appropriate size, and embedded in a visible light curing resin. Subsequently, the test samples are stained for 1 to 2 hours using ruthenium tetraoxide or osmium tetraoxide as a stain, and are then left to stand in liquid nitrogen overnight. Subsequently, an ultra thin section of each sample is prepared using an ultramicrotome, and these sections are then inspected using the TEM.

Other techniques for observing the form (morphology) of the molding resin and the polyester composition include methods for observing the surface hardness using an atomic force microscope, and methods in which, provided a difference in solvent solubility exists between the polyhydroxycarboxylic acid structural units and the polyester structural units, a suitable treatment is conducted by immersing the test specimen in a solvent and removing the soluble fraction, and a scanning electron microscope is then used to observe the form indirectly.

In the case of a molding resin of the present invention, a rotational rheometer can be used to analyze the viscosity and the viscoelastic behavior of the copolymer. Normally, a polymer fluid shows non-linear viscoelasticity, although cases of linear viscoelasticity are known under conditions of low strain, strain rate and stress.

A molding resin of the present invention shows the characteristic that under measurement conditions including a frequency of 1 Hz and a temperature within a range from the melting point of the molding resin through to the melting point +50° C., when the strain of the resin is varied from 1 through to 60%, the storage elastic modulus G'(M%) at a strain of M% ($1 < M \leq 60$) is within a range from 90 to 100% of the value of the storage elastic modulus G'(1%) at a strain of 1%. More specifically, under the conditions described above, the molding resin shows linear viscoelasticity.

There are no particular restrictions on the rotational rheometer described above, and a suitable example is the ARES viscoelasticity measurement device manufactured by TA Instruments Inc.

Furthermore, the preferred conditions for the measurement include a frequency of 1 Hz and a temperature within a range from the melting point of the molding resin through to the melting point +50° C., although in those cases where the viscosity is low at temperatures beyond the melting point of the molding resin, a temperature range from the melting point of the molding resin through to the melting point +30° C. is even more desirable.

For parallel plates of 25 mmφ, there are no particular restrictions on the gap (the distance between the parallel plates) provided it falls within a range from 0.5 to 2.0 mm, although values from 0.5 to 1.0 mm are even more desirable. Furthermore, a cone plate can also be favorably employed instead of the parallel plates.

Under the above conditions, the strain is varied and the curve showing the relationship with the storage elastic modulus (G') is measured. When the strain of the molding resin is varied from 1 through to 60%, the storage elastic modulus G'(M%) at a strain of M% ($1<M\leq 60$) is preferably within a range from 90 to 100%, and even more preferably from 95 to 100%, of the value of the storage elastic modulus G'(1%) at a strain of 1%.

In the conventional resins described above, including the case of a blend of a polyhydroxycarboxylic acid and a polyester obtained by reacting a diol and a dicarboxylic acid, the case where the esterification reaction between the polyhydroxycarboxylic acid and the polyester has not proceeded sufficiently, and the case where a cyclic dimer such as a lactide and a polyester obtained by reacting a diol and a dicarboxylic acid are subjected to copolymerization in the presence of a polymerization catalyst to form a copolymer, when the strain is varied from 1 through to 60% under the conditions described above, the storage elastic modulus G'(M%) at a strain of M% ($1<M\leq 60$) does not fall within a range from 90 to 100% of the value of the storage elastic modulus G'(1%) at a strain of 1%, but is less than 90%, and shows non-linear viscoelasticity. The storage elastic modulus (G') represents the degree of elasticity, and in a molding resin of the present invention, under the measurement conditions described above, the elasticity behavior is essentially uniform, that is, the resin shows linear viscoelasticity.

Next is a description of a production process for a molding resin according to the present invention. In a production process for a molding resin according to the present invention, a molten mixture of a polyhydroxycarboxylic acid (A) with a weight average molecular weight of 10,000 to 400,000, and a polyester (B) with hydroxyl groups at both terminals and with a weight average molecular weight of 10,000 to 200,000, obtained by reacting a dicarboxylic acid and a diol, is subjected to an esterification reaction in the presence of an esterification catalyst (C) and under conditions of reduced pressure, and the esterification reaction is continued until the point where testing of the reaction product, using a rotational rheometer, under measurement conditions including a frequency of 1 Hz and a temperature within a range from the melting point of the molding resin through to the melting point +50° C., and when the strain of the resin is varied from 1 through to 60%, results in a storage elastic modulus G'(M%) at a strain of M% ($1<M\leq 60$) that is within a range from 90 to 100% of the value of the storage elastic modulus G'(1%) at a strain of 1%.

First is a description of the polyhydroxycarboxylic acid (A), and the polyester (B) with hydroxyl groups at both terminals obtained by reacting a dicarboxylic acid and a diol.

The polyhydroxycarboxylic acid (A) used in the present invention may be any material formed from a repeating unit of an aliphatic carboxylic acid with a hydroxyl group within the molecule, and suitable examples include polylactic acid, polycaprolactone, polyglycolic acid, polyhydroxybutyrate, polyhydroxyvalerate, polylactic acid/glycolic acid copolymers, and polyhydroxybutyrate/valerate copolymers, as well as mixtures of these polymers. Amongst these polyhydroxydicarboxylic acids (A), polylactic acid is particularly preferred. Furthermore, in cases such as polylactic acid, where the repeating unit contains an asymmetric carbon, the L-isomer, the D-isomer, mixtures of the L and D isomers (with no particular restrictions on the mixing ratio), or racemic mixtures can all be used.

Furthermore, from the viewpoint of ensuring that the product molding resin is capable of imparting superior levels of transparency, molten moldability and rigidity to polylactic acid (E), the weight average molecular weight of the polyhydroxycarboxylic acid (A) is preferably within a range from 5,000 to 400,000, and even more preferably from 10,000 to 400,000, and even more preferably from 10,000 to 300,000, and most preferably from 15,000 to 250,000.

In addition, the quantity of polylactic acid within the polyhydroxycarboxylic acid (A) is preferably at least 50% by weight, and even more preferably at least 60% by weight. Provided the quantity of polylactic acid within the polyhydroxycarboxylic acid (A) is kept within this range, the co-solubility of the polyhydroxycarboxylic acid (A) with the polylactic acid (E) can be improved. In addition, in those cases where the polyhydroxycarboxylic acid (A) is polylactic acid, the transparency of molded products such as films and sheets can be further improved, which is particularly desirable.

The polyester (B) used in the present invention is obtained by an esterification reaction between a dicarboxylic acid and a diol, contains hydroxyl groups at both terminals of the molecule, and has a weight average molecular weight that preferably falls within a range from 5,000 to 200,000, and even more preferably from 10,000 to 200,000, and most preferably from 15,000 to 200,000.

Preferred examples of the polyester (B) used in the present invention include aliphatic polyesters obtained by reacting an aliphatic dicarboxylic acid with an aliphatic diol, and aliphatic-aromatic polyesters obtained by reacting an aliphatic-aromatic dicarboxylic acid mixture comprising a combination of an aliphatic dicarboxylic acid and an aromatic dicarboxylic acid with an aliphatic diol, and these polyesters can be produced by conventional esterification reactions.

There are no particular restrictions on the type of aliphatic diol employed, provided it contains a chain-like hydrocarbon based chain or an alicyclic hydrocarbon based chain, although aliphatic diols of 2 to 45 carbon atoms are preferred, and specific examples of suitable aliphatic diols include ethylene glycol, 1,3-propanediol, 1,2-butanediol, 1,3-butanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanedimethanol, propylene glycol, neopentyl glycol, 3,3-diethyl-1,3-propanediol, 3,3-dibutyl-1,3-propanediol, 1,2-pentanediol, 1,3-pentanediol, 2,3-pentanediol, 2,4-pentanediol, 2-methyl-2,4-pentanediol, 1,4-pentanediol, 1,2-hexanediol, 1,3-hexanediol, 1,4-hexanediol, 1,5-hexanediol, n-butoxyethylene glycol, cyclohexanedimethanol, hydrogenated bisphenol A, dimer diol, diethylene glycol, dipropylene glycol, triethylene glycol, polyethylene glycol, polypropyleneglycol, polytetramethylene glycol, xylylene glycol, and phenylethylene glycol.

Furthermore, two or more of these diols can also be combined, and suitable combinations include mixtures of propylene glycol and polyethylene glycol, and mixtures of ethylene glycol and 1,4-butanediol. In addition, in the present invention, EO adducts of bisphenol A and PO adducts of bisphenol A, which although containing an aromatic ring are thought of as essentially aliphatic diols, can also be used as the aliphatic diol.

There are no particular restrictions on the aforementioned dicarboxylic acid provided it is either an aliphatic dicarboxylic acid containing either a chain-like hydrocarbon based chain or an alicyclic hydrocarbon based chain, or an aromatic dicarboxylic acid with an aromatic ring, and of the possible compounds, aliphatic dicarboxylic acids of 4 to 45 carbon atoms, or aromatic dicarboxylic acids of 8 to 45 carbon atoms are preferred, and specific examples of suitable dicarboxylic acids include aliphatic dicarboxylic acids such as succinic acid, glutaric acid, adipic acid, pimelic acid, suberic acid, azelaic acid, sebacic acid, decanedicarboxylic acid, cyclohexanedicarboxylic acid and dimer acid, unsaturated aliphatic dicarboxylic acids such as fumaric acid, and aromatic dicarboxylic acids such as phthalic acid, terephthalic acid, isophthalic acid, and naphthalenedicarboxylic acid. Furthermore, two or more of these dicarboxylic acids can also be combined, and suitable combinations include mixtures of terephthalic acid and adipic acid, and mixtures of sebacic acid and dimer acid.

The melting point of the polyester (B) used in the present invention is preferably no more than 150° C. Examples of specific melting points for the polyester (B) include approximately 102° C. for polyethylene succinate, approximately −2° C. for polypropylene succinate, approximately 113° C. for polybutylene succinate, approximately 44° C. for polyethylene adipate, approximately 58° C. for polypropylene adipate, approximately 58° C. for polybutylene adipate, approximately 63° C. for polyethylene sebacate, approximately −41° C. for polypropylene sebacate, and approximately 120° C. for polybutylene adipate/terephthalate (molar ratio of adipic acid:terephthalic acid=1:1), and these materials can be used favorably as the polyester (B).

There are no particular restrictions on the process used for producing the polyester (B), and in one suitable process, the aforementioned diol and dicarboxylic acid are esterified by a conventional esterification reaction using a polymerization catalyst (D). In this case, in order to suppress coloring of the polyester (B), an antioxidant such as a phosphite ester compound may be added in a quantity of 10 to 2000 ppm relative to the combined quantity of the diol and the dicarboxylic acid.

The polyester (B) used in the present invention comprises hydroxyl groups at both terminals, and the diol should be added in excess relative to the dicarboxylic acid. Specifically, molar ratios between the diol and the dicarboxylic acid within a range from diol:dicarboxylic acid=1.4:1.0 to 1.0 (but not including 1.0): 1.0 are preferred, and molar ratios from 1.2:1.0 to 1.0 (but not including 1.0): 1.0 are even more desirable.

The polymerization catalyst (D) is preferably one or more metals or metal compounds selected from a group consisting of elements from the second, third and fourth groups of the periodic table. Examples of polymerization catalysts (D) comprising such a metal or metal compound include metals such as Ti, Sn, Zn, Al, Zr, Mg, Hf and Ge, or metal compounds thereof, and specific examples include titanium tetraisopropoxide, titanium tetrabutoxide, titanium oxyacetylacetonate, tin octanoate, tin 2-ethylhexane, zinc acetylacetonate, zirconium tetrachloride, zirconium tetrachloride tetrahydrofuran complex, hafnium tetrachloride, hafnium tetrachloride tetrahydrofuran complex, germanium oxide, and tetraethoxy germanium.

Furthermore, the quantity of the polymerization catalyst (D) used during production of the polyester (B) is normally a quantity that enables the reaction to be controlled, while achieving a copolymer of favorable quality, and typical quantities are within a range from 10 to 1000 ppm, and preferably from 20 to 800 ppm, relative to the combined quantity of the diol and the dicarboxylic acid, although in order to reduce coloring of the polyester (B), quantities within a range from 30 to 500 ppm are particularly desirable.

A production process for a molding resin according to the present invention is characterized by a process wherein a molten mixture of a polyhydroxycarboxylic acid (A) with a weight average molecular weight of 10,000 to 400,000, and a polyester (B) with hydroxyl groups at both terminals and with a weight average molecular weight of. 10,000 to 200,000, obtained by reacting a dicarboxylic acid and a diol, is subjected to an esterification reaction in the presence of an esterification catalyst (C) and under conditions of reduced pressure, and the esterification reaction is continued until the point where testing of the reaction product, using a rotational rheometer, under measurement conditions including a frequency of 1 Hz and a temperature within a range from the melting point of the molding resin through to the melting point +50° C., and when the strain of the resin is varied from 1 through to 60%, results in a storage elastic modulus G'(M%) at a strain of M% (1<M≦60) that is within a range from 90 to 100% of the value of the storage elastic modulus G'(1%) at a strain of 1%.

In other words, in a production process for a molding resin according to the present invention, the esterification reaction of a polyhydroxycarboxylic acid (A) and a polyester (B) of predetermined molecular weights is an important factor, and in this regard, it is preferable that the polymerization catalysts used in preparing the respective raw materials are deactivated prior to the esterification reaction.

Deactivating the polymerization catalyst (D) contained within the polyester (B) following completion of the synthesis of the polyester (B) is extremely effective. If the polymerization catalyst (D) is not deactivated, then when the polyhydroxycarboxylic acid (A) and the polyester (B) undergo molten mixing, the polymerization catalyst (D) acts on the polyhydroxycarboxylic acid (A) causing a depolymerization reaction, and as a result, production of the target molding resin with a stable molecular weight and stable hue becomes difficult, and the transparency and moldability of the molding resin deteriorate markedly.

An example of a method of deactivating the polymerization catalyst (D) contained within the polyester (B) of the present invention is a method in which a chelating agent is added following completion of the reaction for producing the polyester (B). In this type of method, there are no particular restrictions on the quantity of the deactivation agent added to deactivate the polymerization catalyst (D), and any quantity capable of deactivating the polymerization catalyst (D) used in the production of the polyester (B) is suitable.

The chelating agent that function as the deactivation agent can use conventional organic chelating agents or inorganic chelating agents. Examples of suitable organic chelating agents include amino acids, phenols, hydroxycarboxylic acids, diketones, amines, oximes, phenanthrolines, pyridine compounds, dithio compounds, diazo compounds, thiols, porphyrins, and phenols and carboxylic acids containing nitrogen as a coordinated atom. Examples of suitable inorganic chelating agents include phosphorus compounds such as phosphoric acid, phosphate esters, phosphorous acid, and phosphite esters.

Furthermore, either prior to, or after the addition of the deactivation agent for the polymerization catalyst (D), the polyester (B) may be subjected to a conventional reaction with an acid anhydride or a polyvalent isocyanate or the like to generate a branched chemical structure and further increase the molecular weight.

Next is a description of the process of melting and mixing the polyhydroxycarboxylic acid (A) and the polyester (B).

The raw materials, namely the polyhydroxycarboxylic acid (A) and the polyester (B), are supplied to a reaction vessel, and are melted under an atmosphere of an inert gas, preferably at a temperature of 150 to 230° C. Provided a temperature within this range is employed, the polyhydroxycarboxylic acid (A) can be melted easily, but is unlikely to undergo thermal decomposition. Furthermore, the polyhydroxycarboxylic acid (A) is preferably thoroughly dried in advance, as such drying helps prevent a lowering of viscosity due to hydrolysis, and suppresses coloring of the molding resin, during melting, thus enabling production of a superior molten mixture.

The reaction vessel is preferably a vertical or horizontal tank reactor which is matched to a high vacuum batch or continuous system. There are no particular restrictions on the mixing blade used in the reaction vessel, and the type of blade can be selected in accordance with the viscosity and the molecular weight of the molding resin being produced. Suitable blade shapes in the case of a vertical reaction vessel include paddle type blades, anchor type blades, helical blades and large scale blades, whereas suitable blade shapes in the case of a horizontal reaction vessel include lattice type blades, spectacle blades, and rib type blades. Furthermore, in those cases where the production of the polyester (B) and the subsequent production of the molding resin are conducted within a single reaction vessel, a blade with excellent surface renewability, which is suitable for low viscosity through to high viscosity regions, is preferred.

There are no particular restrictions on the method used for melting the polyhydroxycarboxylic acid (A) and the polyester (B), although the melting is preferably conducted in an inert gas atmosphere. For example, the two components may be supplied simultaneously to the reaction vessel under an atmosphere of an inert gas such as nitrogen or argon, or in those cases where the polyester (B) is a liquid, the polyester (B) may be added first to the reaction vessel, before the polyhydroxycarboxylic acid (A) is added, or the polyhydroxycarboxylic acid (A) and the polyester (B) may be melted first using an extruder or the like, before being added to the reaction vessel.

The esterification catalyst (C) is then added to the resulting molten mixture of the polyhydroxycarboxylic acid (A) and the polyester (B), and an esterification reaction is conducted under conditions of reduced pressure, and the targeted molding resin can be produced by continuing the esterification reaction until the point where testing of the reaction product, using a rotational rheometer, under measurement conditions including a frequency of 1 Hz and a temperature within a range from the melting point of the molding resin through to the melting point +50° C., and when the strain of the resin is varied from 1 through to 60%, results in a storage elastic modulus G'(M%) at a strain of M% ($1 < M \leq 60$) that is within a range from 90 to 100% of the value of the storage elastic modulus G'(1%) at a strain of 1%.

There are no particular restrictions on the melt residence time of the molten mixture of the polyhydroxycarboxylic acid (A) and the polyester (B), and the esterification catalyst (C) may be added to the molten mixture of the polyhydroxycarboxylic acid (A) and the polyester (B) immediately upon melting. The esterification reaction is then preferably conducted at a reaction temperature within a range from 150 to 230° C. and under a reduced pressure of no more than 5,000 pascals (hereafter abbreviated as Pa).

In the present invention, the term esterification reaction includes reactions in which an ester is formed by a dehydration between an acid and an alcohol, as well as reactions in which an ester is acted upon by an alcohol, an acid or another ester, and an acid group or alkoxy group substitution is effected, thus generating a new ester (a transesterification reaction).

The esterification catalyst (C) used in the present invention is one or more elements from the second, third or fourth group of the periodic table, or a compound containing such an element, and examples of preferred elements from the second through fourth groups of the periodic table include Ti, Zr, Hif, Al, Sn, Zn and Mg. Although the catalyst chosen will vary depending on factors such as the reaction temperature, the reaction time, and the quantity of catalyst added, from the viewpoint of suppressing the depolymerization reaction of the polyhydroxycarboxylic acid (A), compounds containing Ti, Zr, Hf or Al are particularly preferred, and examples of compounds containing these elements include $Ti(OC_nH_{2n+1})_4$ [wherein, n is an integer from 1 to 8], $ZrCl_4$, $ZrCl_4$.2tetrahydrofuran (hereafter abbreviated as THF) complex, $HfCl_4$, and $HfCl_4$.2THF complex. More specific examples include titanium tetraisopropoxide and titanium tetrabutoxide.

The quantity used of the esterification catalyst (C) varies depending on the reaction conditions such as the reaction temperature, the reaction time and the level of reduced pressure employed in the esterification reaction process described below, although typical quantities are within a range from preferably 10 to 800 ppm, and even more preferably from 20 to 500 ppm, and most preferably from 30 to 300 ppm, relative to the combined weight of the polyhydroxycarboxylic acid (A) and the polyester (B). Provided the quantity of the esterification catalyst (C) is within the above range, coloring of the product molding resin and the rate of the depolymerization reaction can both be suppressed to a minimum.

There are no particular restrictions on the reaction temperature of the esterification reaction conducted in the present invention, provided it is sufficiently high to melt the polyhydroxycarboxylic acid (A) and the polyester (B), although considering the reaction rate of the esterification reaction and the need to prevent thermal decomposition of the polyhydroxycarboxylic acid (A), the temperature is preferably within a range from 150 to 230° C., and even more preferably from 160 to 220° C., and most preferably from 170 to 220° C.

The reduced pressure for the esterification reaction conducted in the present invention is preferably no more than 5,000 Pa, and even more preferably no more than 2,000 Pa, and most preferably 500 Pa or less. Furthermore, the lower limit for the pressure varies depending on the apparatus used, although the lower limit for the pressure is typically within a range from 5 to 30 Pa.

Furthermore, in the production process for a molding resin according to the present invention, if the above esterification reaction becomes the rate determining step, then the depolymerization reaction of the polyhydroxycarboxylic acid structural units (I) of the product molding resin is accelerated, resulting in the generation of a sublimate. In such cases, phenomena such as deterioration in the reduced pressure of the reaction system and coloring of the reaction product are observed. As a result, the esterification reaction is preferably stopped at a point where the depolymerization reaction of the polyhydroxycarboxylic acid structural units (I) is suppressed as far as possible. On the other hand, if the esterification reaction does not progress sufficiently, then a deterioration is observed in characteristics such as the flexibility, transparency, and impact resistance of the product molding resin and polyester composition.

As follows is a description of the method used for determining the end point of the esterification reaction between the polyhydroxycarboxylic acid (A) and the polyester (B).

In order to obtain the targeted molding resin, the above esterification reaction should be continued until the point where testing of the reaction product of the esterification reaction, using a rotational rheometer, under measurement conditions including a frequency of 1 Hz and a temperature within a range from the melting point of the molding resin through to the melting point +50° C., and when the strain of the resin is varied from 1 through to 60%, results in a storage elastic modulus G'(M%) at a strain of M% ($1 < M \leq 60$) that is within a range from 90 to 100% of the value of the storage elastic modulus G'(1%) at a strain of 1%.

Using this technique for determining the end point of the esterification reaction between the polyhydroxycarboxylic acid (A) and the polyester (B) is very important. That is, by determining the end point of the esterification reaction, not only can a stable production of the targeted molding resin be achieved, but because the product molding resin adopts the type of microphase separated structure described above, excellent levels of impact resistance and flexibility can be achieved, and when the product is used as a molding resin, it is able to impart excellent impact resistance, flexibility, and bleeding resistance to polylactic acid (E).

By subjecting the molding resin produced by the production process of the present invention to conventional processes for removing any residual monomer and the esterification catalyst (C), and deactivating the esterification catalyst (C), the storage stability of the product molding resin can be further improved.

A suitable process for removing any residual monomer involves removal under reduced pressure following treatment for deactivation of the catalyst. Furthermore, suitable processes for removing the esterification catalyst (C) include either immersing the molding resin in a solvent such as a methanol/aqueous hydrochloric acid solution, an acetone/aqueous hydrochloric acid solution, or a mixture of these two solutions, or a process in which the molding resin is dissolved in an appropriate solvent, and one of the above solvents is then mixed with the solution to precipitate out, and hence clean, the polymer. These types of methods can be used to clean the resin and remove any small quantities of residual monomers and oligomers and the like.

An example of a process for deactivating the esterification catalyst (C) used in the present invention is a process in which a chelating agent is added following completion of the esterification reaction. In such a process, there are no particular restrictions on the quantity of the deactivation agent added to deactivate the esterification catalyst (C), and any quantity that is sufficient to effectively deactivate the esterification catalyst (C) used in the production of the molding resin is suitable. More specifically, the weight referenced quantity of the deactivation agent is typically within a range from 0.001 to 10 parts, and preferably from 0.1 to 5 parts, and even more preferably from 0.5 to 2 parts, relative to each 1 part of the esterification catalyst.

The chelating agent can use the same chelating agents described above as being suitable materials for use as the deactivation agent for the polymerization catalyst (D).

A molding resin of the present invention, produced in the manner described above, has a weight average molecular weight that preferably falls within a range from 10,000 to 400,000, and even more preferably from 10,000 to 300,000, and most preferably from 15,000 to 250,000.

A molding resin produced using the production process of the present invention can be added to polylactic acid. In such cases, either one, or two or more different molding resins can be used, and this addition improves the impact resistance and the flexibility of the polylactic acid (E), while retaining the heat resistance and transparency, and suppressing the occurrence of bleeding.

The molding resin preferably has a weight average molecular weight of at least 10,000, and in order to ensure retention of transparency and suppression of bleeding, while also imparting excellent levels of impact resistance and flexibility, the weight average molecular weight is preferably within a range from 10,000 to 400,000, and even more preferably from 10,000 to 300,000, and most preferably from 15,000 to 250,000.

The glass transition temperature (hereafter abbreviated as Tg) of the molding resin, measured using a differential scanning calorimeter (DSC220C, manufactured by Seiko Instruments Inc.) under conditions including a rate of temperature increase of 10° C./minute is preferably within a range from −70 to 65° C., and even more preferably from −65 to 65° C.

Next is a description of a polyester composition comprising a molding resin of the present invention and a polylactic acid (E).

A polyester composition of the present invention is characterized by comprising an aforementioned molding resin according to the present invention and a polylactic acid (E).

The weight average molecular weight of the polylactic acid (E) used in a polyester composition of the present invention is preferably at least 10,000, and even more preferably within a range from 50,000 to 400,000, and most preferably from 100,000 to 300,000. If the polylactic acid (E) used in a polyester composition of the present invention has a weight average molecular weight that falls within the above range, then the composition shows excellent mechanical strength.

The polyester composition of the present invention may be either formed by molten mixing of the polylactic acid (E) and the molding resin, or may also be used as a master batch in which a high concentration of the molding resin is pre-blended with the polylactic acid (E). In a polyester composition of the present invention, there are no particular restrictions on the mixing ratio between the polylactic acid (E) and the molding resin, although for every 100 parts by weight of the polylactic acid (E), the quantity added of the molding resin is preferably within a range from 3 to 70 parts by weight, and even more preferably from 5 to 60 parts by weight, and most preferably from 5 to 50 parts by weight. Provided a mixing ratio within this range is used in the polyester composition, the impact resistance and the flexibility can be improved, while the heat resistance is retained and the occurrence of bleeding is suppressed.

The impact resistance of the polyester composition of the present invention can be controlled by adjusting the quantity of the molding resin. For example, when a film is prepared using a polyester composition of the present invention, a non-stretched film of thickness 200 μm can be imparted with a Dupont impact strength within a range from 0.10 to 5.0 J, whereas a 9-fold (3×3) biaxially stretched film of thickness 35 μm can be imparted with a film impact value within a range from 1.0 to 5.0 J. The corresponding values for polylactic acid are 0.07 J in the case of the former measurement, and 0.90 J in the case of the latter measurement.

Furthermore, when the Izod impact strength is measured using a notched test specimen prepared by injection molding of the polyester composition, the result is preferably within a range from 2.8 to greater than 15.0 KJ/m$^2$, compared with an equivalent value of 2.3 KJ/m$^2$ for polylactic acid. Furthermore, in some cases where a polyester composition of the present invention shows particularly superior impact resistance, the test specimen may not be able to be broken at all.

Normally, the terms sheet and film are distinguished on the basis of thickness, although in this description, the term film is used generically to avoid any confusion. Furthermore, there are no particular restrictions on the film thickness, and this description assumes typical values within a range from 5 μm to 2 mm.

In terms of the flexibility of a polyester composition of the present invention, by preparing a polyester composition film of thickness 200 μm, by adjusting the quantity of the molding resin of the present invention, and then measuring the storage elastic modulus (hereafter abbreviated as E') at a measurement frequency of 6.28 (rad/s) using a dynamic viscoelasticity measuring device (RSAII, manufactured by Rheometrics Ltd.), the result E' for the polyester composition film of the present invention at 25° C. is within a range from 1.0 to 3.0 GPa, compared with a value E' for a film of polylactic acid (E) of 3.0 to 3.5 GPa, and if the quantity of the molding resin added to the composition is at least 30 parts by weight per 100 parts by weight of the polylactic acid (E), and the polyester (B) accounts for at least 50% by weight of the molding resin, then the value of E' for the resulting polyester composition film can be adjusted to a value within a range from 0.6 to 2.4 GPa.

Furthermore, by using a molding resin of the present invention, a polyester composition that is capable of retaining the heat resistance of the polylactic acid (E) can be obtained. Typically, if the glass transition temperature is measured using a differential scanning calorimeter (DSC220C, manufactured by Seiko Instruments Inc.), then the polylactic acid (E) has a glass transition temperature (hereafter abbreviated as Tg) of 55 to 65° C. A polyester composition comprising a molding resin of the present invention and polylactic acid (E), produced by adding 30 parts by weight of the molding resin to 100 parts by weight of the polylactic acid (E), has a Tg value of at least 40° C.

In addition, the polyester composition of the present invention does not lose the transparency of the polylactic acid (E). For example, in the case of a polyester composition in which the quantity of the molding resin is no more than 60 parts by weight per 100 parts by weight of the polylactic acid (E), a pressed film of thickness 100 μm can be produced as a transparent film with a haze value of 1 to 30%. If the quantity of the molding resin of the present invention is kept small, then a film of even better transparency, with a haze value within a range from 1 to 10%, can be produced.

The effects produced by adding a molding resin of the present invention to the polylactic acid (E) can be estimated on the basis of the σ/ρ ratio within the repeating structural unit of the polyester (B) used as a raw material in the production of the molding resin.

In other words, the inventors discovered that a polyester composition of the present invention shows a correlation between the value of σ/ρ, obtained by dividing the solubility parameter (σ) of the polyester (B) by the density (ρ) of that polyester (B), and the characteristics of the composition such as the impact resistance and the flexibility.

As follows is a description of the ratio σ/ρ. The solubility parameter a can be measured easily using the measurement method proposed by Fedors. The targeted numerical ratio can be determined by dividing this value by a known polymer density value, but determining the density of a polymer at the polymer design stage is difficult. Accordingly, by using the formula proposed by Hoy, which is frequently used in the evaluation of the solubility parameter σ, and converts substituent group constants to a molar heat of dissolution per unit volume, a value for σ/ρ can be calculated reasonably easily. Hoy's formula is disclosed, for example, in the non-patent reference 2 shown below.

Non-patent Reference 2: (D. R. Paul and Seymour Newman, Polymer Blends, Vol. 1, Academic Press, pp. 46–47 (1978))

More specifically, the substituent group constants determined from Hoy's formula are calculated as a numerical value for each repeating unit of the polymer, and this value is divided by the molecular weight per repeating unit. That is, σ/ρ=ΣFi/M (wherein, Fi represents a substituent group constant, and M represents the molar molecular weight per repeating unit). Examples of calculated substituent group constants are shown in Table 1.

This calculation method is described below in further detail using the specific example of a polyester with hydroxyl groups at both terminals (hereafter referred to as EG-SuA) produced by the esterification of ethylene glycol (hereafter abbreviated as EG) and succinic acid (hereafter abbreviated as SuA). The repeating unit of EG-SUA is represented by —(CH$_2$—CH$_2$—OCO—CH$_2$—CH$_2$—COO)—, which comprises four substituent groups —(CH$_2$)— and two substituent groups —COO, and consequently:

$\Sigma Fi=(131.5\times 4+326.58\times 2)=1179.16$.

On the other hand, the molar molecular weight (M) per repeating unit is 144.13, and consequently σ/Σ=1179.16/144.13=8.18. A number of examples are shown in the right hand column of Table 1.

TABLE 1

| Substituent group | Fi (substituent group constant) | Number of each substituent group within the repeating unit | | |
|---|---|---|---|---|
| | | EG-SuA | EG-DA | PLA |
| CH$_3$— | 147.30 | | 2 | 1 |
| —(CH$_2$)— | 131.50 | 4 | 26 | |
| >CH— | 85.99 | | 4 | 1 |
| —COO | 326.58 | 2 | 2 | 1 |
| —HC= | 121.53 | | 4 | |
| 6-membered ring | −23.44 | | 1 | |
| ΣFi | | 1179.16 | 5173.4 | 559.87 |
| M (molar molecular weight) | | 144.13 | 586.94 | 72.67 |
| σ/ρ (=ΣFi/M) | | 8.18 | 8.81 | 7.70 |

The symbols in Table 1 have the following meanings:
EG: ethylene glycol
SuA: succinic acid
EG-SuA: polyester with hydroxyl groups at both terminals produced by reacting ethylene glycol and succinic acid
DA: dimer acid
EG-DA: polyester with hydroxyl groups at both terminals produced by reacting ethylene glycol and dimer acid
PLA: polylactic acid Molding resins in which the difference between the σ/ρ value determined for the polyester (B) used as a raw material in the production of the molding resin, and the σ/ρ value (=7.70) for polylactic acid is comparatively small show excellent co-solubility with polylactic acid (E), and the effects of the molding resin in imparting flexibility and retaining transparency are enhanced. More specifically, the σ/ρ value determined for the polyester (B) used as a raw material in the production of the molding resin is preferably within a numerical range from 7.80 to 9.20, and if the value falls within a range from 7.80 to 8.54, then the effect of the molding resin in imparting flexibility and retaining transparency is further enhanced. σ/ρ values within a range from 7.80 to 8.40 are even more preferred, and values from 7.80 to 8.37 are the most desirable.

Furthermore, molding resins in which the difference between the σ/ρ value determined for the polyester (B) used as a raw material in the production of the molding resin, and the σ/ρ value (=7.70) for polylactic acid is comparatively large show poor co-solubility with polylactic acid (E), and consequently the effect of the molding resin in improving the impact resistance is enhanced. More specifically, if the σ/ρ value determined for the polyester (B) used as a raw material in the production of the molding resin is at least 8.54, then the effect of the molding resin in imparting impact resistance is particularly enhanced. σ/ρ values within a range from 8.54 to 9.20 are preferred, values from 8.58 to 9.20 are even more preferred, and values from 8.70 to 9.20 are the most desirable.

Furthermore, where necessary, a molding resin or a polyester composition of the present invention may also comprise additives such as conventional organic fillers, inorganic fillers, antioxidants, ultraviolet absorbers, stabilizers, lubricants, anti-tack agents, any of the various coupling agents, flame retardants, antistatic agents, surfactants, colorants, foaming agents, plasticizers, modifiers, natural additives, and other resins. There are no particular restrictions on the quantity added of these additives, provided the addition does not impair the effects of the present invention, although typical quantities are within a range from 0.01 to 30% by weight, and preferably from 0.01 to 20% by weight, and even more preferably from 0.01 to 10% by weight, relative to the weight of the molding resin or the polyester composition.

There are no particular restrictions on the shape or form of the molding resin or polyester composition, provided it does not impair the effects of the present invention, and the most appropriate form for the intended application can be employed. In other words, typically materials in pellet form are used, but depending on the application, particles or powders such as minipellets, powders and beads, solutions or non-aqueous dispersions using a solvent medium, or emulsions or aqueous dispersions using water as the medium can also be used.

Depending on the intended usage, the molding resin of the present invention may also be reacted with other materials to further increase the molecular weight or impart specific functions, provided such reactions do not impair the effects of the present invention. Examples of such materials include chain extenders such as isocyanate compounds, acid anhydride compounds and chelating agents, as well as materials for imparting specific functions such as any of the various coupling agents and carbodiimide compounds.

When a molded product or film (square film of dimensions 10 cm×10 cm, thickness 250 μm) produced using a molding resin or a polyester composition of the present invention is placed in a thermohygrostat at 35° C. and 80% humidity, no bleeding occurs from the molded product surface, even after 200 days or more has elapsed.

Furthermore, the molded product shows good degradability, and even if left sitting in sea water, still degrades by hydrolysis or biodegradation. After several months sitting in sea water, the molded product can be degraded to the point where it is unable to hold its external form. Furthermore, if compost is used, then the time taken for the product to degrade sufficiently to lose its original form is even shorter. In addition, if incinerated, the product releases no toxic gases or toxic matter.

Molding resins and polyester compositions of the present invention can be used as the resins in a variety of different moldings. Examples of possible uses include molded articles, packaging materials, sanitary materials, materials for medical treatment, fibrous materials, agricultural materials, materials for the fishing industry, materials for laminating onto paper and the like, foam resin materials, synthetic leather materials, and processing aids for use during molding.

More specific examples of molded articles include items such as trays, cups, plates, blister packing, blow molded articles, shampoo bottles, OA casings, cosmetics bottles, drink bottles, oil containers, and injection molded articles (such as golf tees, cotton swab cores, sticks for confectionery, brushes, tooth brushes, helmets, syringe cylinders, plates, cups, combs, handles for razors, cassettes and cases for tapes, disposable spoons and forks, and stationery such as ball point pens).

Examples of packaging materials include sheet materials and film materials, and more specific examples include shrink films, deposition films, wrapping films, packaging for foodstuffs, as well as general packaging, and bags such as rubbish bags, checkout bags, typical standardized bags and heavy duty bags.

Specific examples of sanitary materials include disposable diapers and female sanitary products, examples of materials for medical treatment include bandages for wounds and surgical sutures, examples of fibrous materials include not only woven fabric and knitted fabric, but also lace, braiding, netting, felt and nonwoven fabric, examples of agricultural materials include germination films, seed threads, multi-films for agricultural use, coatings for slow release agricultural chemicals or fertilizers, bird-proof nets, post-planting care films and seedling pots, and examples of materials for the fishing industry include fishing nets, seaweed cultivation nets, fishing line, and paints for boat bottoms.

Furthermore, specific examples of products produced using laminating onto paper include trays, cups, plates and megaphones, as well as binding tape (binding bands), prepaid cards, balloons, panty stockings, hair caps, sponges, cellophane tape, umbrellas, raincoats, plastic gloves, hair caps, ropes, tubes, foam trays, foam cushioning materials, other cushioning, material for boxes, and tobacco filters, and specific examples of synthetic leather materials include materials produced by covering a cloth or paper substrate with a resin, which are useful in a variety of fields including in vehicles, household furniture, building materials, bags, footwear, clothing and stationery.

In addition to the specific applications listed above, molding resins and polyester compositions of the present invention are also useful as paint resins, ink resins, toner resins, resins for adhesives, resins for dot adhesion, and resins for primers.

EXAMPLES

As follows is a description of details of the present invention, using a series of examples and comparative examples. Unless stated otherwise, the units "parts" and "%" in the examples refer to weight referenced values.

The various characteristics were measured using the methods described below.

[Method of Measuring Number Average Molecular Weight (Mn) and Weight Average Molecular Weight (Mw)]

Using a gel permeation chromatography measurement device (hereafter abbreviated as GPC) HLC-8020 manufactured by Tosoh Corporation, measurements were conducted using tetrahydrofuran as the developing solvent, which were then compared with standard polystyrene values.

[Method of Measuring Thermal Properties]

Using a differential scanning calorimeter DSC 220C (hereafter abbreviated as DSC) manufactured by Seiko Instruments Inc., the glass transition temperature (Tg) and the melting point (Tm) were measured in accordance with JIS K 7121.

[Method of Measuring Proton Nuclear Magnetic Resonance ($^1$H-NMR)]

Using a $^1$H-NMR apparatus (JNM-LA300, manufactured by Jeol Ltd.), a chloroform-d ($CDCl_3$) solution was prepared and measured to determine the weight ratio between the polyhydroxycarboxylic acid (A) and the polyester (B) within the molding resin.

[Method of Measuring Storage Elastic Modulus (E')]

Using a RSAII device manufactured by Rheometrics Ltd., and a frequency of 6.28 rad/s, test specimens of the molding resin and the polyester composition with dimensions of thickness 200 [2m×width 5 mm×length 35 mm were measured using film texture geometry, and the value at 25° C. was used as the storage elastic modulus (E').

[Method of Measuring Transparency]

200 μm thick films of the molding resin and the polyester composition were cut into 5 cm×5 cm squares, and haze measurements were conducted using a turbidity meter (ND-1001DP, manufactured by Nippon Denshoku Industries Co., Ltd.).

[Method of Measuring Dupont Impact Strength]

Using a Dupont impact strength measurement apparatus, a uniform weight was dropped from different heights and the occurrence of rupture was observed, thus enabling the 50% rupture energy to be determined (in accordance with JIS K 5400) for the above films.

[Method of Testing and Evaluating Bleeding]

A 200 μm thick film of the polyester composition was placed in a thermohygrostat PR-2F manufactured by Tabai Espec Corporation with the conditions fixed at 35° C. and 80% humidity, and samples for which no bleeding was observed even after 200 days were recorded with the evaluation symbol ○, whereas those samples which showed bleeding prior to 200 days were recorded with the evaluation symbol x.

[Method of Overall Evaluation]

Based on the results of the above transparency test, Dupont impact strength test, storage elastic modulus (E') measurement, and bleeding test, each sample was awarded one of 4 evaluation grades to indicate its practical utility (○○: excellent, ○: good, Δ: usable, x: unusable).

[Observation by Transmission Eelectron Microscope]

A 200 μm thick sample film was embedded in a visible light curing resin, stained for 1 to 2 hours using ruthenium tetraoxide, and then left to stand in liquid nitrogen overnight. Subsequently, an ultra thin section of the sample was prepared using an ultramicrotome, and this ultra thin section was inspected using a transmission electron microscope (hereafter abbreviated as TEM, JEM-200CX manufactured by Jeol Datum Ltd.). Based on the result of the TEM observation, for example by viewing a 10,000× magnification photograph, the average domain size was determined by measuring the diameter of a certain number of domains from the photograph, and calculating the average value. The measured value for each domain size was calculated as the average value of the major axis and the minor axis.

[Measurement of Melt Viscoelasticity]

The strain vs. G' curve for the molding resin was measured using an ARES viscoelasticity measurement device manufactured by TA Instruments Inc. The measurement conditions were as follows. Frequency: 1 Hz, measurement temperature: 180° C., jig: parallel plates (diameter 25 mm), gap (the distance between the parallel plates): 1 mm. The values for the storage elastic modulus G'(1%) when the strain was 1% and the storage elastic modulus G'(60%) when the strain was 60% were read from the generated strain vs. G' curve, and the ratio (G'(60%)/G'(1%)) between the values G'(60%) and G'(1%) was calculated.

Production processes for the polyesters (B), (B-1) to (B-7) are shown below in <Reference example 1> through <Reference example 7>.

<Reference Example 1>

Production of an Aliphatic Polyester (B-1)

In a reaction vessel were placed 1 mol equivalent of sebacic acid (hereafter abbreviated as SeA) and 1.4 mol equivalents of propylene glycol (hereafter abbreviated as PG), and with a stream of nitrogen passing through the vessel, the temperature was increased, with constant stirring, from 1 50° C. to 230° C. at a rate of 10° C. per hour, while the generated water was removed, thus effecting an esterification reaction. After 2 hours, titanium tetraisopropoxide was added as a polymerization catalyst (D) in a quantity equivalent to 100 ppm relative to the weight of the raw materials, and the pressure was then reduced to 200 Pa and the polymerization reaction allowed to proceed for 8 hours. As a result, an aliphatic polyester (B-1) with a number average molecular weight (hereafter abbreviated as Mn) of 35,000 and a weight average molecular weight (hereafter abbreviated as Mw) of 62,000 was obtained.

<Reference Example 2>

Production of an Aliphatic Polyester (B-2)

In a reaction vessel were placed I mol equivalent of SeA and 1.4 mol equivalents of PG, and with a stream of nitrogen passing through the vessel, the temperature. was increased, with constant stirring, from 150° C. to 230° C. at a rate of 10° C. per hour, while the generated water was removed, thus effecting an esterification reaction. After 2 hours, titanium tetraisopropoxide was added as a polymerization catalyst (D) in a quantity equivalent to 100 ppm relative to the weight of the raw materials, and the pressure was then reduced to 200 Pa and the polymerization reaction allowed to proceed for 8 hours. Following completion of the reaction, 2-ethylhexanoic acid phosphate was added as a deactivation agent for the polymerization catalyst (D), in a quantity equivalent to 110 ppm relative to the weight of the raw materials, and the pressure was then reduced to 333 Pa and the mixture was stirred for 1 hour at 220° C. As a result, an aliphatic polyester (B-2) with a Mn value of 35,000 and a Mw value of 63,000 was obtained.

<Reference Example 3>

Production of an Aliphatic Polyester (B-3)

In a reaction vessel were placed 1 mol equivalent of SeA and 1.4 mol equivalents of PG, and with a stream of nitrogen passing through the vessel, the temperature was increased, with constant stirring, from 150° C. to 230° C. at a rate of 10° C. per hour, while the generated water was removed, thus effecting an esterification reaction. After 2 hours, titanium tetrabutoxide was added as a polymerization catalyst (D) in a quantity equivalent to 50 ppm relative to the weight of the raw materials, and the pressure was then reduced to 200 Pa and the polymerization reaction allowed to proceed for 3 hours. Following completion of the reaction, 2 parts of pyromellitic dianhydride (hereafter abbreviated as PMDA) was added, and the reaction was continued for a further 3 hours at 200° C., with the pressure maintained at 0.1 kPa. Following completion of the reaction, diethylhexylphosphonic acid was added as a deactivation agent for the polymerization catalyst (D), in a quantity equivalent to 100 ppm relative to the weight of the raw materials, and the pressure was then reduced to 266 Pa and the mixture was stirred for 1 hour at 220° C. As a result, an aliphatic polyester (B-3) with a Mn value of 33,000 and a Mw value of 75,000 was obtained.

<Reference Example 4>

Production of an Aliphatic Polyester (B-4)

In a reaction vessel were placed 76 parts of succinic acid (hereafter abbreviated as SuA), 24 parts of adipic acid (hereafter abbreviated as AA), and 1.4 mol equivalents of 1,4-butanediol (hereafter abbreviated as 1,4BG) for every 1 mol equivalent of AA and SuA, and with a stream of nitrogen passing through the vessel, the temperature was increased, with constant stirring, from 150° C. to 220° C. at a rate of 10° C. per hour, while the generated water was removed, thus effecting an esterification reaction. After 2 hours, titanium tetrabutoxide was added as a polymerization catalyst (D) in a quantity equivalent to 50 ppm relative to the weight of the raw materials, and the pressure was then reduced to 133 Pa and the polymerization reaction allowed to proceed for 5 hours. The polyester obtained at the completion of the reaction was dissolved in toluene to prepare a 20% by weight toluene solution, 0.05 parts of hexamethylene diisocyanate (hereafter abbreviated as HMDI) was added relative 100 parts of the polyester, 0.01 parts of tin octanoate was also added relative to 100 parts of the polyester, and the reaction was continued for a further 1 hour at 100° C. Following completion of the reaction, monopropylphosphonic acid was added as a deactivation agent for the polymerization catalyst (D), in a quantity equivalent to 200 ppm relative to the weight of the raw materials, and the pressure was then reduced to 650 Pa and the mixture was stirred for 1 hour at 180° C. As a result, an aliphatic polyester (B-4) with a Mn value of 51,000 and a Mw value of 95,000 was obtained.

<Reference Example 5>

Production of an Aliphatic Polyester (B-5)

In a reaction vessel were placed 1 mol equivalent of SuA and 1.4 mol equivalents of PG, and with a stream of nitrogen passing through the vessel, the temperature was increased, with constant stirring, from 150° C. to 220° C. at a rate of 10° C. per hour, while the generated water was removed, thus effecting an esterification reaction. After 2 hours, titanium tetraisopropoxide was added as a polymerization catalyst (D) in a quantity equivalent to 150 ppm relative to the weight of the raw materials, and the pressure was then reduced to 133 Pa and the polymerization reaction allowed to proceed for 7 hours. Following completion of the reaction, 2-ethylhexanoic acid phosphate was added as a deactivation agent for the polymerization catalyst (D), in a quantity equivalent to 150 ppm relative to the weight of the raw materials, and the pressure was then reduced to 133 Pa and the mixture was stirred for 1 hour at 220° C. As a result, an aliphatic polyester (B-5) with a Mn value of 18,000 and a Mw value of 27,000 was obtained.

<Reference Example 6>

Production of an Aliphatic-Aromatic Polyester (B-6)

In a reaction vessel were placed 47 parts of AA and 53 parts of terephthalic acid (hereafter abbreviated as TPA) as the dicarboxylic acids, and 1.25 mol equivalents of 1,4BG for every 1 mol equivalent of the dicarboxylic acids, and with a stream of nitrogen passing through the vessel, the temperature was increased, with constant stirring, from 150° C. to 230° C. at a rate of 10° C. per hour, while the generated water was removed, thus effecting an esterification reaction. After 2 hours, titanium isopropoxide was added as a polymerization catalyst (D) in a quantity equivalent to 100 ppm relative to the weight of the raw materials, and the pressure was then reduced to 133 Pa and the polymerization reaction allowed to proceed for 8 hours. Following completion of the reaction, 2-ethylhexanoic acid phosphate was added as a deactivation agent for the polymerization catalyst (D), in a quantity equivalent to 110 ppm relative to the weight of the raw materials, and the pressure was then reduced to 133 Pa and the mixture was stirred for 1 hour at 200° C. As a result, an aliphatic-aromatic polyester (B-6) with a Mn value of 48,000 and a Mw value of 103,000 was obtained.

<Reference Example 7>

Production of an Aliphatic Polyester (B-7)

In a reaction vessel were placed 1 mol equivalent of SuA, 0.4 mol equivalents of PG, and 1.0 mol equivalents of polyethylene glycol (Mn 780, Mw 840, hereafter abbreviated as PEG 1), and with a stream of nitrogen passing through the vessel, the temperature was increased, with constant stirring, from 150° C. to 220° C. at a rate of 10° C. per hour, while the generated water was removed, thus effecting an esterification reaction. After 2 hours, titanium tetrabutoxide was added as a polymerization catalyst (D) in a quantity equivalent to 80 ppm relative to the weight of the raw materials, and the pressure was then reduced to 200 Pa and the polymerization reaction allowed to proceed for 5 hours. Following completion of the reaction, 2-ethylhexanoic acid phosphate was added as a deactivation agent for the polymerization catalyst (D), in a quantity equivalent to 150 ppm relative to the weight of the raw materials, and the pressure was then reduced to 133 Pa and the mixture was stirred for 1 hour at 220° C. As a result, an aliphatic polyetherester (B-7) with a Mn value of 16,000 and a Mw value of 25,000 was obtained.

The contents of the polyesters (B) obtained in the reference examples 1 to 7 are summarized in Table 2.

further measurement of the molecular weight revealed a molten mixture with a Mn value of 51,000, and a Mw value of 104,000.

Subsequently, titanium tetrabutoxide was added as an esterification catalyst (C), in a quantity equivalent to 200 ppm relative to the molten mixture, and the reaction was allowed to proceed for 4 hours at a reduced pressure of 80 Pa. When the value of the ratio G'(60%)/G'(1%) reached

TABLE 2

|  | Reference example 1 | Reference example 2 | Reference example 3 | Reference example 4 | Reference example 5 | Reference example 6 | Reference example 7 |
|---|---|---|---|---|---|---|---|
| polymer | B-1 | B-2 | B-3 | B-4 | B-5 | B-6 | B-7 |
| σ/ρ ratio | 8.54 | 8.54 | 8.54 | 8.40 | 8.10 | 8.54 | 8.30 |
| raw materials for polyester (B) | | | | | | | |
| diol component | PG | PG | PG | 1,4BG | PG | 1,4BG | PG, PEG1 |
| dicarboxylic acid component | SeA | SeA | SeA | SuA/AA = 76/24 wt % | SuA | AA/TPA = 47/53 wt % | SuA |
| molecular weight increasing agent | — | — | PMDA | HMDI Sn octanoate | — | — | — |
| esterification catalyst (C) | TIPT | TIPT | TIBT | TIBT | TIPT | TIPT | TIBT |
| deactivation agent for esterification catalyst (C) | — | 2-EtHP | DEHPA | MPA | 2-EtHP | 2-EtHP | 2-EtHP |
| properties of polyester (B) | | | | | | | |
| melting point (° C.) | −21 | −21 | −21 | 94 | — | 118 | −31 |
| Mw | 62,000 | 63,000 | 75,000 | 95,000 | 27,000 | 103,000 | 25,000 |
| Mn | 35,000 | 35,000 | 33,000 | 51,000 | 18,000 | 48,000 | 16,000 |

(Note 1:
the symbols in Table 2 have the following meanings:
PG: propylene glycol
1,4BG: 1,4-butanediol
SeA: sebacic acid
SuA: succinic acid
AA: adipic acid
TPA: terephthalic acid
PEG1: polyethylene glycol
PMDA: pyromellitic dianhydride
HMDI: hexamethylene diisocyanate
TIPT: titanium tetraisopropoxide
TIBT: titanium tetrabutoxide
2-EtHP: 2-ethylhexanoic acid phosphate
DEHPA: diethylhexylphosphonic acid
MPA: monopropylphosphonic acid Production processes for molding resins (C-1) to (C-7) are shown below in <Example 1> through <Example 7>.

<Example 1>

Production of a Molding Resin (C-1)

In a reaction vessel was placed 50 parts of the aliphatic polyester (B-2) obtained in the reference example 2, and with the inside of the vessel under an atmosphere of nitrogen, the vessel was heated using a jacket temperature of 200° C. Subsequently, 50 parts of a polylactic acid [Mn 92,000, Mw 170,000, and L:D ratio=98.5:1.5 (molar ratio), hereafter abbreviated as PLA1] was added and subjected to molten mixing. Once the (B-2) and the PLA1 had been visually confirmed as having formed a uniform molten mixture, the molecular weight was measured, revealing a Mn value of 51,000, and a Mw value of 105,000. Molten mixing was then continued for a further 2 hours, and a 100%, the reaction was stopped. Following completion of the reaction, 2-ethylhexanoic acid phosphate was added as a deactivation agent for the esterification catalyst (C), in a quantity equivalent to 500 ppm relative to the reaction mixture, thus yielding a molding resin (C-1) with a Mn value of 58,000 and a Mw value of 125,000. The product (C-1) had a higher molecular weight than that observed following melting, and was a solid. Furthermore, GPC spectral measurement revealed a single peak, and the average domain size was 1.25 μm.

<Example 2>

Production of a Molding Resin (C-2)

In a reaction vessel was placed 10 parts of the aliphatic polyester (B-2) obtained in the reference example 2, and with the inside of the vessel under an atmosphere of nitrogen, the vessel was heated using a jacket temperature of 205° C. Subsequently, 90 parts of PLA1 was added and subjected to molten mixing. Once the (B-2) and the PLA1 had been visually confirmed as having formed a uniform molten mixture, the molecular weight was measured, revealing a Mn value of 47,000, and a Mw value of 102,000. Molten mixing was then continued for a further 2 hours, and a further measurement of the molecular weight revealed a molten mixture with a Mn value of 47,000, and a Mw value of 101,000.

Subsequently, titanium tetrabutoxide was added as an esterification catalyst (C), in a quantity equivalent to 100 ppm relative to the molten mixture, and the reaction was allowed to proceed for 3 hours at a reduced pressure of 133 Pa. When the value of the ratio G'(60%)/G'(1%) reached 100%, the reaction was stopped. Following completion of the reaction, 2-ethylhexanoic acid phosphate was added as a deactivation agent for the esterification catalyst (C), in a quantity equivalent to 500 ppm relative to the reaction mixture, thus yielding a molding resin (C-2) with a Mn value of 70,000 and a Mw value of 126,000. The product (C-2) had a higher molecular weight than that observed following melting, and was a solid. Furthermore, GPC spectral measurement revealed a single peak, and the average domain size was 2.00 μm.

<Example 3>

Production of a Molding Resin (C-3)

In a reaction vessel was placed 30 parts of the aliphatic polyester (B-3) obtained in the reference example 3, and with the inside of the vessel under an atmosphere of nitrogen, the vessel was heated using a jacket temperature of 190° C. Subsequently, 60 parts of a polylactic acid [Mn 42,000, Mw 87,000, and L:D ratio=100:0 (molar ratio), hereafter abbreviated as PLA2] and 10 parts of polycaprolactone (Mn 32,000, Mw 52,000, hereafter abbreviated as PCL) were added and subjected to molten mixing. Once the (B-3), the PLA2 and the PCL had been visually confirmed as having formed a uniform molten mixture, the molecular weight was measured, revealing a Mn value of 36,000, and a Mw value of 83,000. Molten mixing was then continued for a further 2 hours, and a further measurement of the molecular weight revealed a molten mixture with a Mn value of 36,000, and a Mw value of 83,000.

Subsequently, titanium tetrabutoxide was added as an esterification catalyst (C), in a quantity equivalent to 250 ppm relative to the molten mixture, and the reaction was allowed to proceed for 4.5 hours at a reduced pressure of 133 Pa. When the value of the ratio G'(60%)/G'(1%) reached 97%, the reaction was stopped. Following completion of the reaction, 2-ethylhexanoic acid phosphate was added as a deactivation agent for the esterification catalyst (C), in a quantity equivalent to 500 ppm relative to the reaction mixture, thus yielding a molding resin (C-3) with a Mn value of 43,000 and a Mw value of 92,000. The product (C-3) had a higher molecular weight than that observed following melting, and was a solid. Furthermore, GPC spectral measurement revealed a single peak, and the average domain size was 2.50 μm.

<Example 4>

Production of a Molding Resin (C-4)

In a reaction vessel was placed 40 parts of the aliphatic polyester (B-4) obtained in the reference example 4, and with the inside of the vessel under an atmosphere of nitrogen, the vessel was heated using a jacket temperature of 205° C. Subsequently, 60 parts of PLA1 was added and subjected to molten mixing. Once the (B-4) and the PLA1 had been visually confirmed as having formed a uniform molten mixture, the molecular weight was measured, revealing a Mn value of 48,000, and a Mw value of 105,000. Molten mixing was then continued for a further 2 hours, and a further measurement of the molecular weight revealed a molten mixture with a Mn value of 48,000, and a Mw value of 104,000.

Subsequently, titanium tetrabutoxide was added as an esterification catalyst (C), in a quantity equivalent to 100 ppm relative to the molten mixture, and the reaction was allowed to proceed for 3 hours at a reduced pressure of 133 Pa. When the value of the ratio G'(60%)/G'(1%) reached 100%, the reaction was stopped. Following completion of the reaction, 2-ethylhexanoic acid phosphate was added as a deactivation agent for the esterification catalyst (C), in a quantity equivalent to 350 ppm relative to the reaction mixture, thus yielding a molding resin (C-4) with a Mn value of 70,000 and a Mw value of 156,000. The product (C-4) had a higher molecular weight than that observed following melting, and was a solid. Furthermore, GPC spectral measurement revealed a single peak, and the average domain size was 0.85 μm.

<Example 5>

Production of a Molding Resin (C-5)

In a reaction vessel was placed 50 parts of the aliphatic polyester (B-5) obtained in the reference example 5, and with the inside of the vessel under an atmosphere of nitrogen, the vessel was heated using a jacket temperature of 190° C. Subsequently, 50 parts of a polylactic acid [Mn 150,000, Mw 250,000, and L:D ratio=100:0 (molar ratio), hereafter abbreviated as PLA3] was added and subjected to molten mixing. Once the (B-5) and the PLA3 had been visually confirmed as having formed a uniform molten mixture, the molecular weight was measured, revealing a Mn value of 56,000, and a Mw value of 136,000. Molten mixing was then continued for a further 1 hour, and a further measurement of the molecular weight revealed a molten mixture with a Mn value of 51,000, and a Mw value of 134,000.

Subsequently, titanium tetrabutoxide was added as an esterification catalyst (C), in a quantity equivalent to 100 ppm relative to the molten mixture, and the reaction was allowed to proceed for 3 hours at a reduced pressure of 200 Pa. When the value of the ratio G'(60%)/G'(1%) reached 99%, the reaction was stopped. Following completion of the reaction, 2-ethylhexanoic acid phosphate was added as a deactivation agent for the esterification catalyst (C), in a quantity equivalent to 500 ppm relative to the reaction mixture, thus yielding a molding resin (C-5) with a Mn value of 72,000 and a Mw value of 155,000. The product (C-5) had a much higher molecular weight than that observed following melting, and was a solid. Furthermore, GPC spectral measurement revealed a single peak, and the average domain size was 0.20 μm.

<Example 6>

Production of a Molding Resin (C-6)

In a reaction vessel was placed 75 parts of the aliphatic-aromatic polyester (B-6) obtained in the reference example 6, and with the inside of the vessel under an atmosphere of nitrogen, the vessel was heated using a jacket temperature of 190° C. Subsequently, 25 parts of a polylactic acid [Mn 85,000, Mw 160,000, and L:D ratio=95:5 (molar ratio), hereafter abbreviated as PLA4] was added and subjected to molten mixing. Once the (B-6) and the PLA4 had been visually confirmed as having formed a uniform molten mixture, the molecular weight was measured, revealing a Mn value of 51,000, and a Mw value of 109,000. Molten mixing was then continued for a further 5 hours, and a further measurement of the molecular weight revealed a molten mixture with a Mn value of 51,000, and a Mw value of 108,000.

Subsequently, titanium tetrabutoxide was added as an esterification catalyst (C), in a quantity equivalent to 150 ppm relative to the molten mixture, and the reaction was allowed to proceed for 5 hours at a reduced pressure of 250 Pa. When the value of the ratio G'(60%)/G'(1%) reached 100%, the reaction was stopped. Following completion of the reaction, 2-ethylhexanoic acid phosphate was added as a deactivation agent for the esterification catalyst (C), in a quantity equivalent to 400 ppm relative to the reaction mixture, thus yielding a molding resin (C-6) with a Mn value of 60,000 and a Mw value of 135,000. The product (C-6) had a higher molecular weight than that observed following melting, and was a solid. Furthermore, GPC spectral measurement revealed a single peak, and the average domain size was 1.20 μm.

<Example 7>

Production of a Molding Resin (C-7)

In a reaction vessel was placed 50 parts of the aliphatic polyetherester (B-7) obtained in the reference example 7, and with the inside of the vessel under an atmosphere of nitrogen, the vessel was heated using a jacket temperature of 205° C. Subsequently, 50 parts of PLA1 was added and subjected to molten mixing. Once the (B-7) and the PLA1 had been visually confirmed as having formed a uniform molten mixture, the molecular weight was measured, revealing a Mn value of 26,000, and a Mw value of 38,000. Molten mixing was then continued for a further 3 hours, and a further measurement of the molecular weight revealed a molten mixture with a Mn value of 26,000, and a Mw value of 36,000.

Subsequently, titanium tetrabutoxide was added as an esterification catalyst (C), in a quantity equivalent to 150 ppm relative to the molten mixture, and the reaction was allowed to proceed for 4 hours at a reduced pressure of 250 Pa. When the value of the ratio G'(60%)/G'(1%) reached 93%, the reaction was stopped. Following completion of the reaction, 2-ethylhexanoic acid phosphate was added as a deactivation agent for the esterification catalyst (C), in a quantity equivalent to 400 ppm relative to the reaction mixture, thus yielding a molding resin (C-7) with a Mn value of 30,000 and a Mw value of 42,000. The product (C-7) had a higher molecular weight than that observed following melting, and was a solid. Furthermore, GPC spectral measurement revealed a single peak, and the average domain size was 0.30 μm.

<Comparative Example 1>

In a reaction vessel was placed 50 parts of the aliphatic polyester (B-1) obtained in the reference example 1, and with the inside of the vessel under an atmosphere of nitrogen, the vessel was heated at 205° C. Subsequently, 50 parts of PLA4 was added and subjected to molten mixing. Once the (B-1) and the PLA4 had been visually confirmed as having formed a uniform molten mixture, the molecular weight was measured, revealing a Mn value of 34,000, and a Mw value of 80,000. Molten mixing was then continued for a further 3 hours, and a further measurement of the molecular weight revealed a molten mixture with a Mn value of 32,000, and a Mw value of 56,000.

Subsequently, titanium tetrabutoxide was added as an esterification catalyst (C), in a quantity equivalent to 150 ppm relative to the molten mixture, and the reaction was allowed to proceed for 5 hours at a reduced pressure of 133 Pa. When the value of the ratio G'(60%)/G'(1%) reached 85%, the reaction was stopped. Following completion of the reaction, 2-ethylhexanoic acid phosphate was added as a deactivation agent for the esterification catalyst (C), in a quantity equivalent to 350 ppm relative to the reaction product, thus yielding a reaction product (C-8) with a Mn value of 36,000 and a Mw value of 63,000. The average domain size was 15.0 μm.

<Comparative Example 2>

In a reaction vessel was placed 50 parts of the aliphatic polyester (B-2) obtained in the reference example 2, and with the inside of the vessel under an atmosphere of nitrogen, the vessel was heated at 195° C. Subsequently, 50 parts of PLA1 was added and subjected to molten mixing. Once the (B-2) and the PLA1 had been visually confirmed as having formed a uniform molten mixture, the molecular weight was measured, revealing a Mn value of 48,000, and a Mw value of 101,000. Molten mixing was then continued for a further 1 hour, and a further measurement of the molecular weight revealed a molten mixture with a Mn value of 48,000, and a Mw value of 100,000.

Subsequently, titanium tetrabutoxide was added as an esterification catalyst (C), in a quantity equivalent to 120 ppm relative to the molten mixture, and the reaction was allowed to proceed for 8 hours at atmospheric pressure. When the value of the ratio G'(60%)/G'(1%) reached 55%, the reaction was stopped. Following completion of the reaction, 2-ethylhexanoic acid phosphate was added as a deactivation agent for the esterification catalyst (C), in a quantity equivalent to 200 ppm relative to the reaction product, thus yielding a reaction product (C-9) with a Mn value of 26,000 and a Mw value of 46,000. The average domain size was 30.0 μm.

<Comparative Example 3>

In a reaction vessel was placed 50 parts of the aliphatic polyester (B-2) obtained in the reference example 2, and with the inside of the vessel under an atmosphere of nitrogen, the vessel was heated at 195° C. Subsequently, 50 parts of PLA1 was added and subjected to molten mixing. Once the (B-2) and the PLA1 had been visually confirmed as having formed a uniform molten mixture, the molecular weight was measured, revealing a Mn value of 48,000, and a Mw value of 100,000. Molten mixing was then continued for a further 1 hour, and a further measurement of the molecular weight revealed a molten mixture with a Mn value of 48,000, and a Mw value of 100,000.

Subsequently, titanium tetrabutoxide was added as an esterification catalyst (C), in a quantity equivalent to 150 ppm relative to the molten mixture, and the reaction was allowed to proceed for 0.5 hours at a reduced pressure of 133 Pa. When the value of the ratio G'(60%)/G'(1%) reached 34%, the reaction was stopped. Following completion of the reaction, 2-ethylhexanoic acid phosphate was added as a deactivation agent for the esterification catalyst (C), in a quantity equivalent to 300 ppm relative to the reaction product, thus yielding a reaction product (C-10) with a Mn value of 48,000 and a Mw value of 100,000. The product was a strong yellow color and sticky. The average domain size was 6.0 μm.

The examples 1 to 7 and the comparative examples 1 to 3 are summarized in Table 3 and Table 4.

The molecular weight values for the molten mixtures of the polyhydroxycarboxylic acid (A) and the polyester (B) from the examples 1 to 7 remained essentially constant regardless of melt residence time, whereas in the case of the comparative example 1, where the step for deactivating the polymerization catalyst (D) for the polyester (B) was not carried out, the molecular weight of the molten mixture decreased significantly as the melt residence time was lengthened. Furthermore, the thus obtained molten mixture contained a large quantity of lactides.

Furthermore, from the results of the comparative example 2 it is evident that even if the polymerization catalyst (D) contained within the polyester (B) is deactivated, if the pressure is not reduced, then the action of the polymerization catalyst (D) causes a depolymerization of the polyhydroxycarboxylic acid (A), making it impossible to achieve the desired copolymer. In addition, from the results of the comparative example 3 it is clear that if the reaction time for the esterification reaction is overly short, then an increase in the viscosity of the molten mixture does not materialize, resulting in a product state which is essentially identical with that of a simple molten mixture.

Furthermore, the weight ratios between the polyhydroxycarboxylic acid (A) and the polyester (B) in the molding resins obtained in the examples 1 to 7, which were determined using NMR spectral measurements, were substantially identical with the ratios between the quantities of the polyhydroxycarboxylic acid (A) and the polyester (B) used in the reaction. In contrast, the weight ratios between the polyhydroxycarboxylic acid (A) and the polyester (B) in the reaction products obtained in the comparative example 1 and the comparative example 2 differed significantly from the ratios between the quantities of the polyhydroxycarboxylic acid (A) and the polyester (B) used in the reaction. Furthermore, in the measurements of the strain vs. storage elastic modulus (G') curves using a rotational rheometer, the ratio of G'(60%)/G'(1%) in each of the molding resins obtained in the examples 1 to 7 was essentially 100%, whereas in each of the reaction products obtained in the comparative examples 1 to 3, the ratio was no more than 85%.

Furthermore, the values for the average domain size of the islands phase, measured on the basis of the TEM observations, were within a range from 0.08 to 5.0 μm in the case of the molding resins obtained in the examples 1 to 7, whereas the corresponding values for the reaction products obtained in the comparative examples I to 3 were all greater than 5.0 μm. From the fact that the average domain size of the islands phase in the comparative example 3, where the reaction time of the esterification reaction was very short, was 6.0 μm, it is clear that when considering the length of the esterification reaction and the average domain size of the islands phase, with lapse of the reaction time for the esterification reaction, and to optimize the average domain size for the islands phase is optimized to within a range from 0.08 to 5.0 μm.

TABLE 3

|  | Example 1 | Example 2 | Example 3 | Example 4 | Example 5 | Example 6 | Example 7 |
|---|---|---|---|---|---|---|---|
| Polyhydroxycarboxylic acid (A) | PLA1 | PLA1 | PLA2/PCL | PLA1 | PLA3 | PLA4 | PLA1 |
| Mw | 170,000 | 170,000 | 87,000/52,000 | 170,000 | 250,000 | 160,000 | 170,000 |
| Mn | 92,000 | 92,000 | 42,000/32,000 | 92,000 | 150,000 | 85,000 | 92,000 |
| Quantity added | 50 | 90 | 60/10 | 60 | 50 | 25 | 50 |
| Polyester (B) | B-2 | B-2 | B-3 | B-4 | B-5 | B-6 | B-7 |
| Quantity added | 50 | 10 | 30 | 40 | 50 | 75 | 50 |
| Molding resin |  |  |  |  |  |  |  |
| Name of molding resin | C-1 | C-2 | C-3 | C-4 | C-5 | C-6 | C-7 |
| Mw | 125,000 | 126,000 | 92,000 | 156,000 | 155,000 | 135,000 | 42,000 |
| Mn | 58,000 | 70,000 | 43,000 | 70,000 | 72,000 | 60,000 | 30,000 |
| Tg(° C.) | −47, 53 | −46, 53 | −44, 54 | −12 | 50 | −23, 55 | −48 |
| Tm(° C.) | −24, 164 | −24, 165 | −21, 160 | 57, 94 | 1, 161 | 115, 160 | −30, 161 |
| Weight ratio of polyhydroxycarboxylic acid (A)/polyester (B) | 49/51 (wt %) | 90/10 (wt %) | 59, 9/32 (wt %) | 58/42 (wt %) | 48/52 (wt %) | 25/75 (wt %) | 51/49 (wt %) |
| G'(60%)/G'(1%) ratio | 100 | 100 | 98 | 100 | 99 | 100 | 93 |
| Average domain size (Mm) | 1.25 | 2.00 | 2.50 | 0.85 | 0.20 | 1.20 | 0.30 |

TABLE 4

|  | Comparative example 1 | Comparative example 2 | Comparative example 3 |
|---|---|---|---|
| Polyhydroxycarboxylic acid (A) | PLA4 | PLA1 | PLA1 |
| Mw | 160,000 | 170,000 | 170,000 |
| Mn | 85,000 | 92,000 | 92,000 |
| Quantity added | 50 | 50 | 50 |
| Polyester (B) | B-1 | B-2 | B-2 |
| Quantity added | 50 | 50 | 50 |
| Reaction product |  |  |  |
| Name of reaction product | C-8 | C-9 | C-10 |
| Mw | 63,000 | 46,000 | 100,000 |
| Mn | 36,000 | 26,000 | 48,000 |
| Tg(° C.) | −48 | −51, 50 | −51, 53 |
| Tm(° C.) | −21, 158 | −23, 160 | −21, 161 |
| Weight ratio of polyhydroxycarboxylic acid (A)/polyester (B) | 33/64 (wt %) | 28/72 (wt %) | 50/50 (wt %) |

TABLE 4-continued

|  | Comparative example 1 | Comparative example 2 | Comparative example 3 |
|---|---|---|---|
| G'(60%)/G'(1%) ratio | 85 | 55 | 34 |
| Average domain size (μm) | 15.0 | 30.0 | 6.0 |

Note 1)
In Table 3, Table 4 and Table 5, the units for the values listed under "quantity added" or "number of parts added", unless other wise stated, refer to weight referenced values.
Note 2)
In Table 3 and Table 4, the weight ratio of polyhydroxycarboxylic acid (A)/polyester (B) refers to the weight ratio of polyhydroxycarboxylic acid structural units/polyester structural units.

<Example 8>

The molding resin (C-2) obtained in the example 2 was dried under reduced pressure for 3 hours at 60° C., and then a thermal press device was used to prepare a film of thickness 200 μm at a temperature of 195° C. The haze value of the film was 15%, the Dupont impact value was 0.51 J, the storage elastic modulus (E') at 25° C. was 1.80 GPa, the bleeding was evaluated as O, and the overall evaluation was recorded as OO.

<Examples 9 to 14>

Preparation of Polyester Compositions (P-1) to (P-6)

PLA1, the product (C-1) obtained in the example 1, and the products (C-3) to (C-7) obtained in the examples 3 to 7 were dried under reduced pressure for 3 hours at 60° C., and then using the mixing ratios shown in Table 6 and Table 7, the materials were subjected to molten mixing for 10 minutes at 190° C. using a laboplast mill mixer manufactured by Toyo Seiki Kogyo Co., Ltd., thus forming polyester compositions (P-1) to (P-6).

Comparative Examples 4 to 6

Preparation of Polyester Compositions (P-7) to (P-9)

PLA1, and the products (C-8) to (C-10) obtained in the comparative examples 1 to 3 were dried under reduced pressure for 3 hours at 60° C., and then using the mixing ratios shown in Table 6 and Table 7, the materials were subjected to molten mixing for 10 minutes at 190° C. using a laboplast mill mixer manufactured by Toyo Seiki Kogyo Co., Ltd., thus forming polyester compositions (P-7) to (P-9).

The thus prepared polyester compositions (P-1) to (P-9) were dried under reduced pressure for 3 hours at 60° C., and then a thermal press device was used to prepare films of thickness 200 μm at a temperature of 195° C.

<Comparative Example 7>

Preparation of a Film of PLA1

A sample of PLA1 was dried under reduced pressure for 3 hours at 70° C., and then a thermal press device was used to prepare a film of thickness 200 μm at a temperature of 195° C.

For each of the films prepared in the examples 9 to 14 and the comparative examples 4 to 7, the results from a haze measurement, measurement of the Dupont impact strength, measurement of the storage elastic modulus (hereafter abbreviated as E'), evaluation of bleeding, and an overall evaluation are shown in Table 5 and Table 6.

TABLE 5

|  | Example 9 | Example 10 | Example 11 | Example 12 | Example 13 | Example 14 |
|---|---|---|---|---|---|---|
| Polyester composition | P-1 | P-2 | P-3 | P-4 | P-5 | P-6 |
| Polylactic acid | PLA1 | PLA1 | PLA1 | PLA1 | PLA1 | PLA1 |
| Number of parts added | 100 | 100 | 100 | 100 | 100 | 100 |
| Molding resin | C-1 | C-3 | C-4 | C-5 | C-6 | C-7 |
| Number of parts added | 10 | 10 | 10 | 30 | 30 | 25 |
| Haze value (%) | 10 | 18 | 15 | 2 | 26 | 5 |
| Dupont impact strength (J) | 0.35 | 0.33 | 0.30 | 0.18 | 0.51 | 0.26 |
| E' (GPa/25° C.) | 2.8 | 2.6 | 2.5 | 1.9 | 2.3 | 2.1 |
| Bleeding evaluation | O | O | O | O | O | O |
| Overall evaluation | OO | OO | O | OO | O | OO |

TABLE 6

|  | Comparative example 4 | Comparative example 5 | Comparative example 6 | Comparative example 7 |
|---|---|---|---|---|
| Polyester composition | P-7 | P-8 | P-9 | PLA1 |
| Polylactic acid | PLA1 | PLA1 | PLA1 | PLA1 |
| Number of parts added | 100 | 100 | 100 | — |
| Reaction product | C-8 | C-9 | C-10 | — |
| Number of parts added | 15 | 15 | 5 | — |
| Haze value (%) | 15 | 30 | 9 | 2 |
| Dupont impact strength (J) | 0.18 | 0.30 | 0.18 | 0.08 |
| E' (GPa/25° C.) | 2.9 | 2.7 | 3.0 | 3.3 |
| Bleeding evaluation | x | x | x | o |
| Overall evaluation | x | x | x | Δ |

As shown in the examples 9 to 14, polyester compositions comprising a molding resin according to the present invention show superior impact resistance, flexibility, transparency and bleeding characteristics when compared with the comparative examples 4 to 7, which comprise either a reaction product in which the polymerization catalyst (D)

within the polyester (B) has not undergone deactivation treatment, a reaction product obtained when the esterification reaction was conducted at atmospheric pressure, or a reaction product obtained when the esterification reaction was conducted for a short period under reduced pressure.

<Example 15>

Decomposition Testing

Samples of the molding resins and the polyester compositions obtained in the examples 1 to 14 were prepared as either blocks or films sandwiched between wire gauze, and these samples were then buried in an electric compost maintained at 45° C. When the wire gauze was removed after 30 to 60 days, the molding resins and the polyester compositions had essentially lost their original forms. After 60 to 120 days, decomposition had progressed sufficiently that the presence of the samples could no longer be confirmed. These results confirm that the molding resins and polyester compositions obtained in the present invention show excellent decomposition properties.

<Example 16>

Solvent Solubility Testing

Solvent solubility tests were conducted by placing 15 mg samples of PLA1, the aliphatic polyester (B-4) obtained in the reference example 4, a molten blend of PLA1 and (B-4), and the molding resin (C-4) obtained in the example 4, together with 15 ml of either chloroform (hereafter abbreviated as CHCl$_3$) or tetrahydrofuran (hereafter abbreviated as THF), in sample vials, and then placing the sample vials in a hot water bath (at approximately 60 to 80° C.). The molten blend of PLA1 and (B-4) was prepared by molten mixing of the two components for 10 minutes at 190° C. using a laboplast mill mixer manufactured by Toyo Seiki Kogyo Co., Ltd.

The results of the solvent solubility tests conducted in the example 16 are shown in Table 7. Samples which dissolved were recorded as O, and insoluble samples were recorded as x.

TABLE 7

| Example 16 | PLA1 | Aliphatic polyester (B-4) | Molten blend of PLA1 and (B-4) | Molding resin (C-4) |
|---|---|---|---|---|
| CHCl$_3$ | o | o | o | o |
| THF | o | x | x | o |

In the example 16, the solvent solubility of the molding resin (C-4) in THF showed solvent solubility characteristics that were different from those of (B-4) and the molten blend of PLA1 and (B-4), despite the fact that the molding resin (C-4) contained (B-4). This finding suggests that the PLA1 and (B-4) have copolymerized.

A production process for a molding resin (C-11) and a molding resin (C-12) used for investigating the morphology of the molding resins is described in <example 17> and <example 18> respectively. Furthermore, production processes for copolymers (L-1) to (L-3) formed by ring opening copolymerization reactions of a lactide and the polyester (B-2) in the presence of a catalyst are described in <comparative example 8> to <comparative example 10> respectively.

<Example 17> and <Example 18>

Production Process for Molding Resins (C-11) and (C-12)

Using the procedure described in the example 1, molding resins (C-11) and (C-12) were produced with ratios between the aliphatic polyester (B-2) and PLA1 of 30/70 (weight ratio) and 70/30 (weight ratio) respectively.

<Comparative Example 8>

Production of Copolymer (L-1)

In a reaction vessel was placed 30 parts of the aliphatic polyester (B-2), and with the inside of the vessel under an atmosphere of nitrogen, the polyester was heated and melted using a jacket temperature of 180° C. Subsequently, 70 parts of L-lactide was added, and 5 parts of toluene was used to dissolve the mixture. Once the aliphatic polyester (B-2) and the L-lactide had been visually confirmed as having formed a uniform mixed solution, tin octoate was added in a quantity equivalent to 300 ppm relative to the molten mixture, and the reaction was allowed to proceed at 180° C. for 5 hours. Following completion of the reaction, 2-ethylhexanoic acid phosphate was added in a quantity equivalent to 450 ppm relative to the reaction mixture, thus yielding a resin (L-1) with a Mn value of 57,000 and a Mw value of 107,000. The thus obtained copolymer (L-1) was a white solid that showed a single peak upon GPC spectral measurement.

<Comparative Example 9> and <Comparative Example 10>

Production Process for Copolymers (L-2) and (L-3)

Using the procedure described in the comparative example 8, copolymers (L-2) and (L-3) were produced with ratios between the aliphatic polyester (B-2) and L-lactide of 50/50 (weight ratio) and 70/30 (weight ratio) respectively.

The contents of the molding resins (C-11) and (C-12) obtained in the example 17 and the example 18, and the copolymers (L-1) to (L-3) obtained in the comparative examples 8 to 10 are summarized in Table 8.

TABLE 8

|  | Example 17 | Example 18 | Comparative example 8 | Comparative example 9 | Comparative example 10 |
|---|---|---|---|---|---|
| Polyhydroxycarboxylic acid (A) | PLA1 | PLA1 | (L-lactide) | (L-lactide) | (L-lactide) |
| Mw | 170,000 | 170,000 | — | — | — |
| Mn | 92,000 | 92,000 | — | — | — |
| Quantity added (parts) | 70 | 30 | 30 | 50 | 70 |

TABLE 8-continued

|  | Example 17 | Example 18 | Comparative example 8 | Comparative example 9 | Comparative example 10 |
|---|---|---|---|---|---|
| Polyester (B) | B-2 | B-2 | B-2 | B-2 | B-2 |
| Quantity added (parts) | 30 | 70 | 70 | 50 | 30 |
| Copolymer | C-11 | C-12 | L-1 | L-2 | L-3 |
| Mw | 167,000 | 107,000 | 105,000 | 72,000 | 64,000 |
| Mn | 57,000 | 43,000 | 54,000 | 39,000 | 32,000 |
| Weight ratio of polyhydroxycarboxylic acid (A)/polyester (B) (wt %) | 70/30 | 29/71 | 30/70 | 50/50 | 72/28 |
| G'(60%)/G'(1%) ratio (%) | 1.50 | 3.50 | 86 | 76 | 0.03 |
| Average domain size (μm) | 1.50 | 3.50 | 0.06 | Note 1 | Note 1 |

Note 1
In the comparative example 9 and the comparative example 10 in Table 8, the morphology observed by TEM was a lamellar structure or a layer-like structure in which the spacing between phases was from 0.03 to 0.05 μm.

Note 2
In Table 8, the weight ratio (wt %) of polyhydroxycarboxylic acid (A)/polyester (B) refers to the weight ratio of polyhydroxycarboxylic acid structural units/polyester structural units.

<Reference Example 8>

Morphology Observation of Molding Resins Using Transmission Electron Microscope (TEM)

Using the molding resin (C-1) obtained in the example 1, the molding resin (C-11) obtained in the example 17, and the molding resin (C-12) obtained in the example 18, films of thickness 200 μm were prepared and inspected using a TEM.

Figure 2:
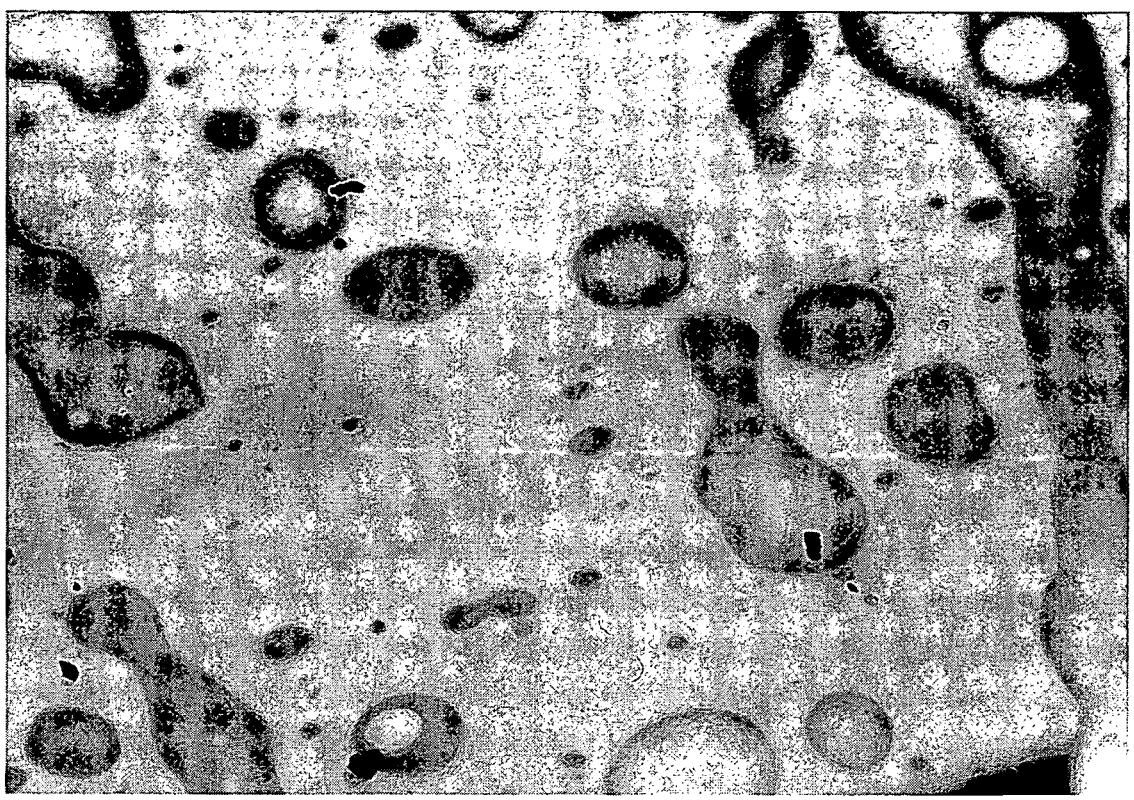
FIG. 2 is a TEM photograph of a film of a molding resin (C-12) obtained in an example 18, in the reference example 8. The black sections in the TEM photograph (FIG. 2) show polyester structural units (II), and the white sections show polyhydroxycarboxylic acid structural units (I).
Figure 3:
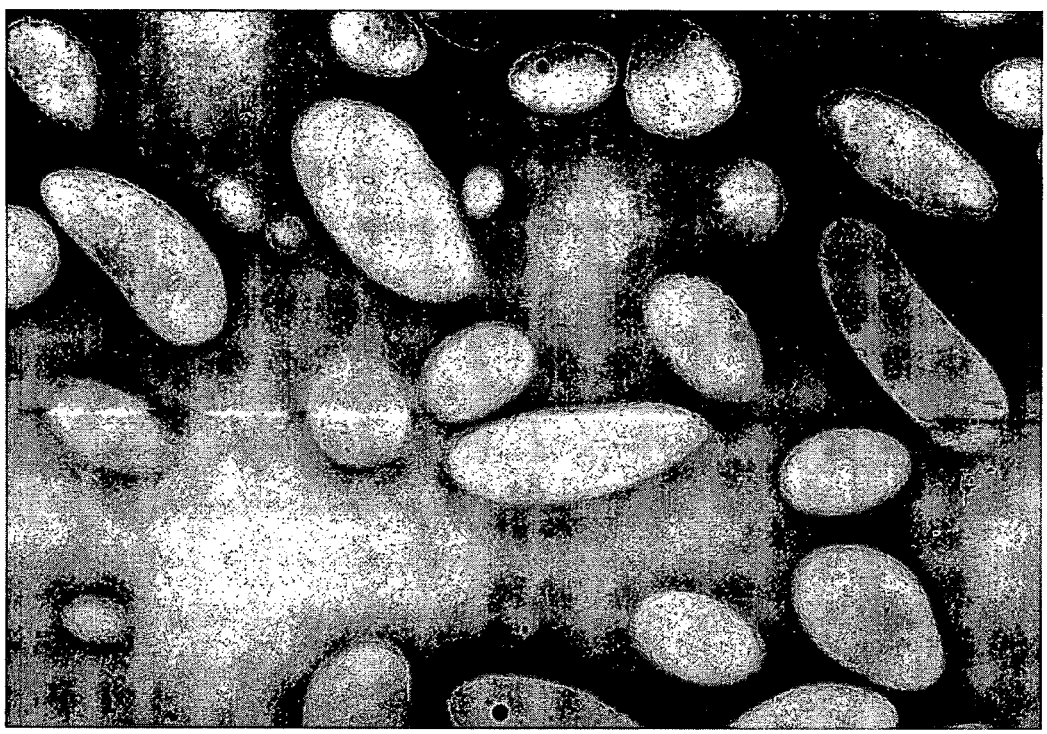
FIG. 3 is a TEM photograph of a film of a molding resin (C-13) obtained in an example 19, in the reference example 8. The black sections in the TEM photograph (FIG. 3) show polyester structural units, and the white sections show polyhydroxycarboxylic acid structural units.

The results of the TEM observations conducted on the molding resins (C-1), (C-11) and (C-12) in the reference example 8 are shown in FIG. 1 through FIG. 3. TEM observation of the film of the molding resin (C-1) obtained in the example 1 revealed a dispersed configuration comprising an islands phase of the (B-2) structural units with a domain size of 0.30 to 2.50 μm dispersed within a sea phase comprising the PLA1 structural units. Furthermore, within a portion of the islands, a further phase separation was observed, with a morphology in which an islands phase of PLA1 structural units was dispersed within a sea phase of (B-2) structural units.

Furthermore, TEM observation of the film of the molding resin (C-11) obtained in the example 17 revealed a morphology comprising an islands phase of the (B-2) structural units with a domain size of 0.10 to 2.00 μm dispersed within a sea phase comprising the PLA1 structural units. Furthermore, TEM observation of the film of the molding resin (C-12) obtained in the example 18 revealed a morphology comprising an islands phase of the PLA1 structural units with a domain size of 0.50 to 2.00 μm dispersed within a sea phase comprising the polyester (B-2) structural units.

<Reference Example 9>

Morphology Observation of Copolymers (L-1) to (L-3) Using TEM

Figure 4:
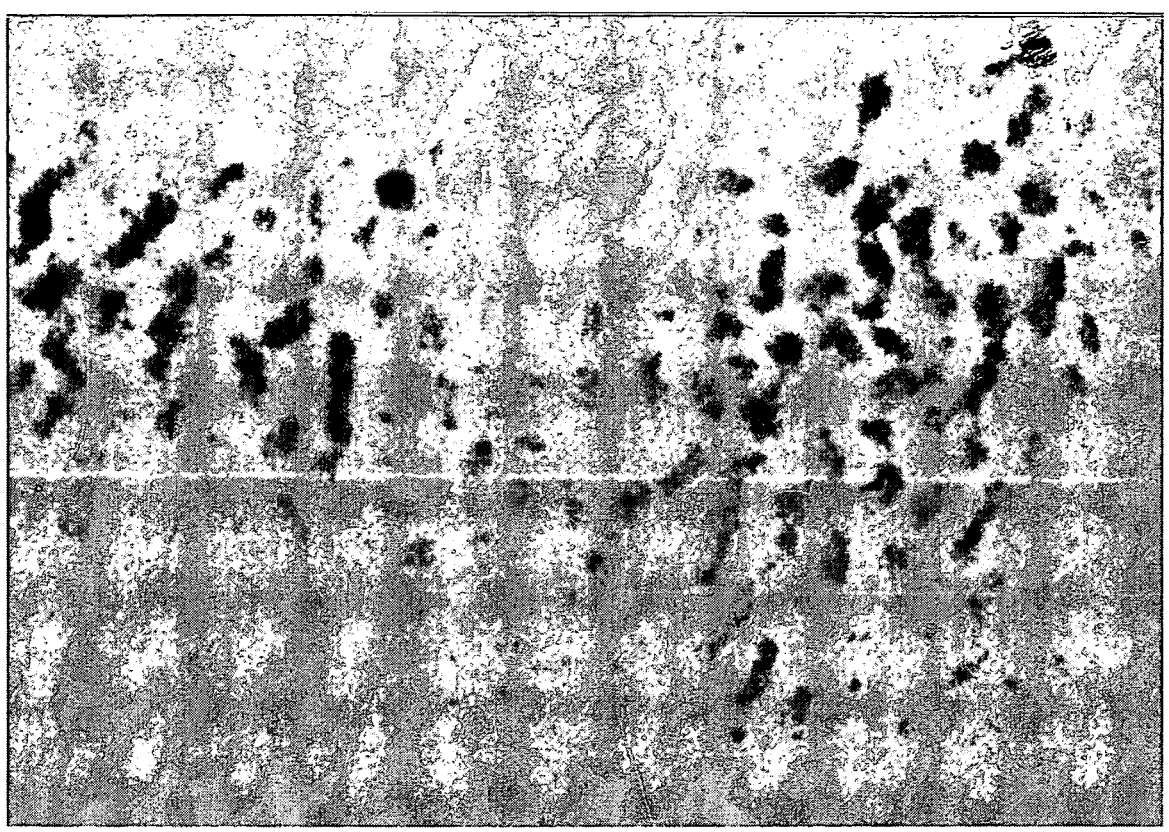
FIG. 4 is a TEM photograph of a film of a copolymer (L-1) obtained in a comparative example 8, in a reference example 9. The black sections in the TEM photograph (FIG. 4) show polyester structural units (II), and the white sections show polyhydroxycarboxylic acid structural units.
Figure 5:
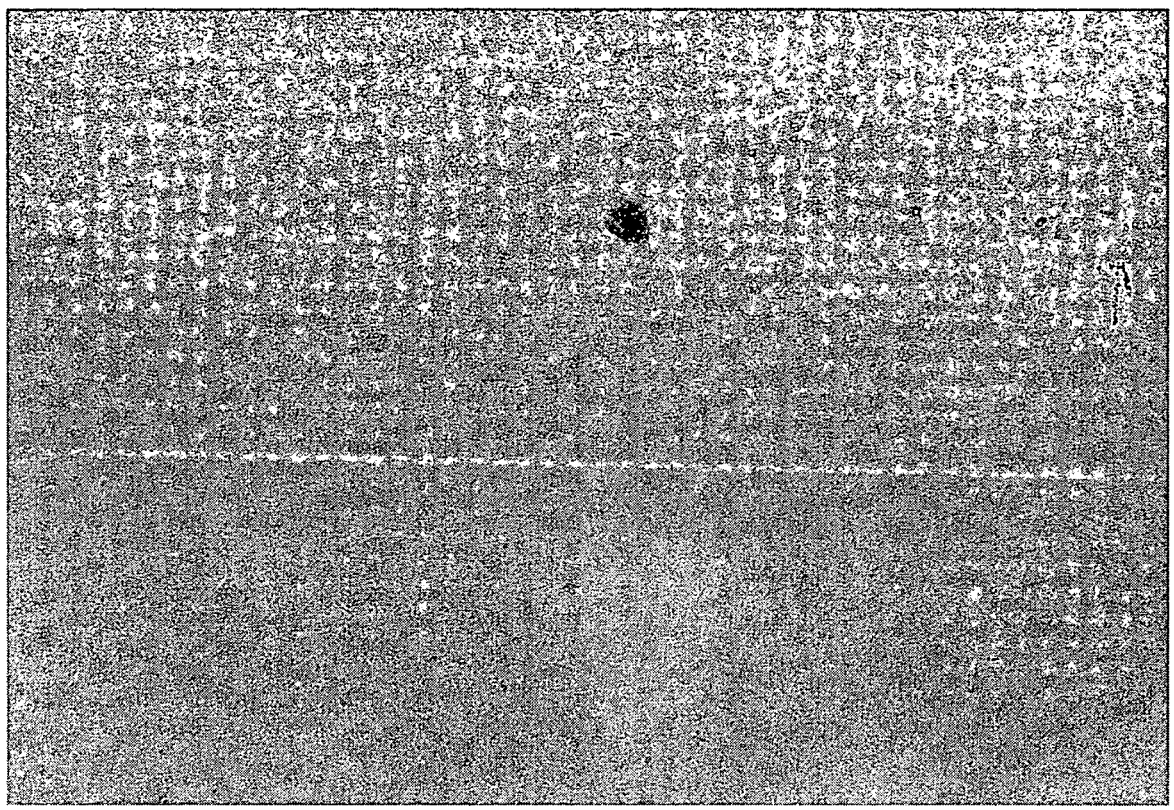
FIG. 5 is a TEM photograph of a film of a copolymer (L-2) obtained in a comparative example 9, in the reference example 9. The black sections in the TEM photograph (FIG. 5) show polyester structural units (II), and the white sections show polyhydroxycarboxylic acid structural units (I).
Figure 6:
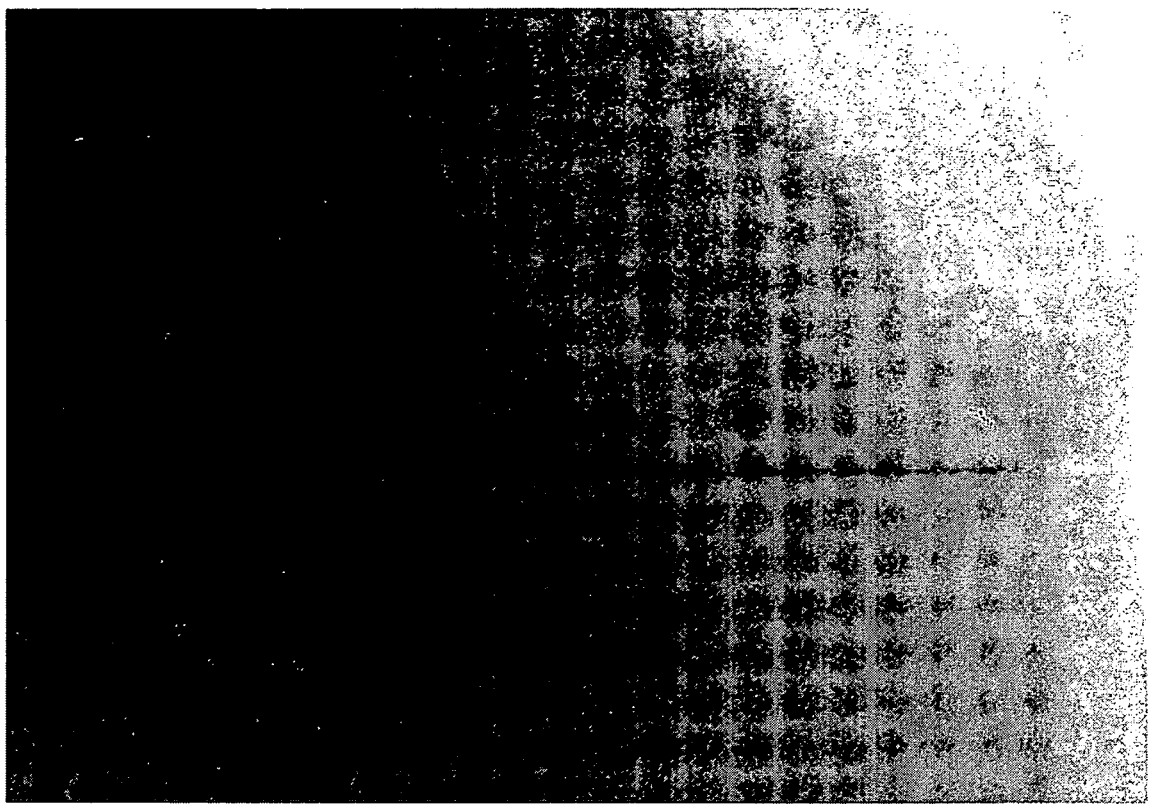
FIG. 6 is a TEM photograph of a film of a copolymer (L-3) obtained in a comparative example 10, in the reference example 9. The black sections in the TEM photograph (FIG. 6) show polyester structural units (II), and the white sections show polyhydroxycarboxylic acid structural units.

In a similar manner to the reference example 8, but using the copolymers (L-1) to (L-3) obtained in the comparative examples 8 to 10, films of thickness 200 μm were prepared and inspected using a TEM. The results of the morphology observations conducted on the copolymers (L-1) to (L-3) in the reference example 9 are shown in FIG. 4 through FIG. 6.

TEM observation of the film of the copolymer (L-1) obtained in the comparative example 8 revealed a morphology comprising an islands phase of the (B-2) structural units with an average domain size of 0.03 to 0.05 m dispersed within a sea phase comprising the PLA1 structural units.

Furthermore, TEM observation of the film of the copolymer (L-2) obtained in the comparative example 9 revealed a morphology comprising alternating layers of the (B-2) structural units and the PLA1 structural units with a spacing of 0.03 to 0.05 μm.

Furthermore, TEM observation of the film of the copolymer (L-3) obtained in the comparative example 10 revealed a morphology comprising alternating layers of the (B-2) structural units and the PLA1 structural units with a spacing of 0.03 to 0.05 μm.

The molding resin morphologies observed in the reference example 8 comprised an islands phase of either the polyhydroxycarboxylic acid structural units (I) or the polyester structural units (II) with a domain size of 0.1 to 3.0 μm.

In contrast, in the morphologies of the copolymers observed in the reference example 9, either the polyester (B) formed an islands phase with a domain size of 0.02 to 0.05 μm (L-1), or the polyhydroxycarboxylic acid structural units (I) and the polyester structural units (II) formed alternating layers (L-2, L-3). In other words, a product from the production process of the reference example 8 shows an average domain size at the micro level, whereas a product from the production process of the reference example 9 shows an average domain size at the nano level.

<Reference Example 10>

TEM Observation of Polyester Compositions

Using the polyester composition (P-1) obtained in the example 9, a film of thickness 200 μm was prepared and inspected using a TEM.

Figure 7:
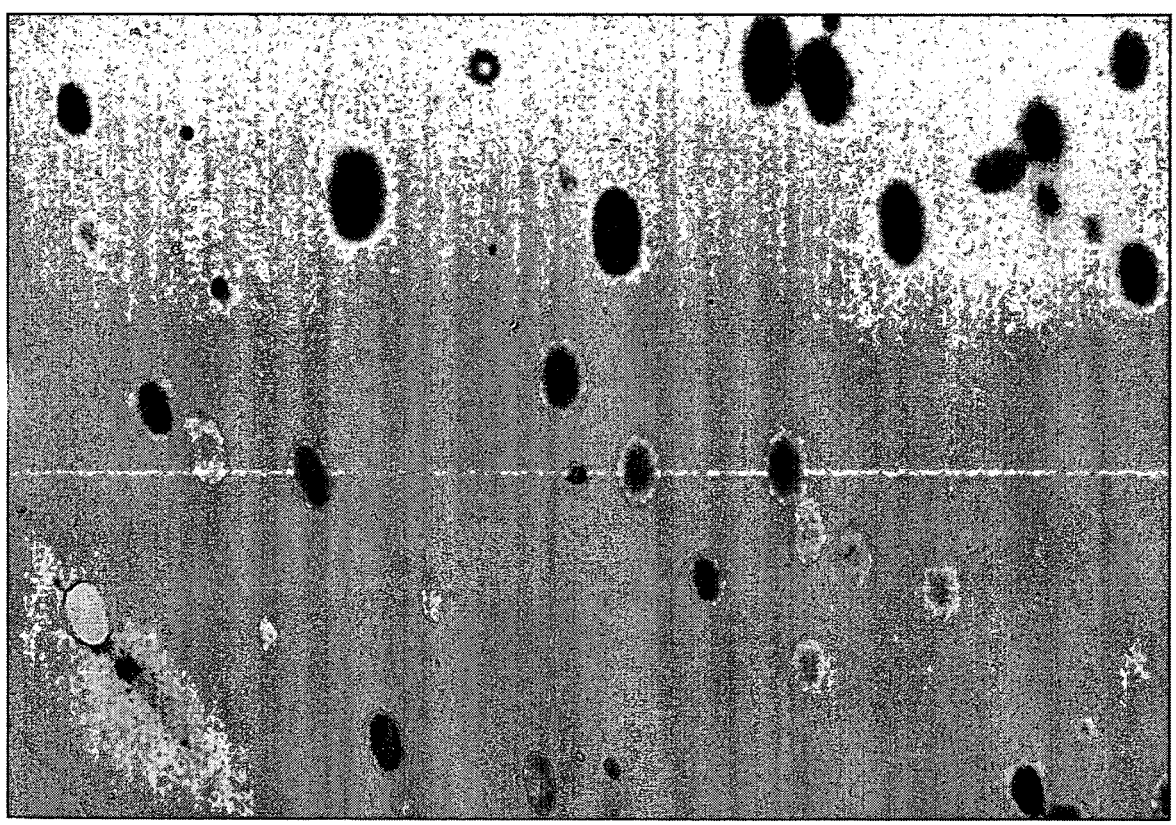
FIG. 7 is a TEM photograph of a film of a polyester composition (P-i) obtained in an example 9, in a reference example 10. The black sections in the TEM photograph (FIG. 7) show molding resin structural units derived from polyester structural units (B) with hydroxyl groups at both terminals, and the white sections show polylactic acid.

The result of the TEM observation conducted on the polyester composition (P-1) in the reference example 10 is shown in FIG. 7. From the result of the TEM observation of the film of the polyester composition (P-1) it is evident that the film shows a morphology comprising an islands phase of polyester structural units (II) derived from the molding resin with a domain size of 0.1 to 0.3 μm dispersed within a sea phase comprising the polylactic acid (E).

<Reference Examples 11> to 13

PLA1, and the copolymers (L-2) and (L-3) obtained in the comparative example 9 and the comparative example 10 were dried under reduced pressure for 3 hours at 60° C., and then using the mixing ratios shown in Table 9, the materials were subjected to molten mixing for 10 minutes at 190° C. using a laboplast mill mixer manufactured by Toyo Seiki Kogyo Co., Ltd., thus forming polyester compositions (P-11) and (P-12). The thus prepared polyester compositions were dried under reduced pressure for 3 hours at 60° C., and then a thermal press device was used to prepare films of thickness 200 μm at a temperature of 195° C.

For each of the films prepared in the reference examples 11 and 12, and the example 10, the results from a haze measurement, measurement of the Dupont impact strength, measurement of the storage elastic modulus (hereafter abbreviated as E'), evaluation of bleeding, and an overall evaluation are shown in Table 9.

TABLE 9

|  | Reference example 11 | Reference example 12 | Example 1 |
|---|---|---|---|
| Polyester composition | P-11 | P-12 | P-1 |
| Polylactic acid (E) | PLA1 | PLA1 | PLA1 |
| Number of parts added | 100 | 100 | 100 |
| Molding resin | L-2 | L-3 | C-1 |
| Number of parts added | 10 | 10 | 10 |
| Haze value (%) | 4 | 10 | 10 |
| Dupont impact strength (J) | 0.14 | 0.25 | 0.35 |
| E' (GPa/25° C.) | 3.2 | 2.8 | 2.8 |
| Bleeding evaluation | ○ | Δ | ○ |
| Overall evaluation | x | Δ | ○○ |

As shown in Table 9, the case where the compositional ratio of the polyester (B) within the molding resin is uniform, that is, the polyester composition (P-1) obtained in the example 1 of the present invention, is able to impart a far superior level of impact resistance than the polyester composition (P-1) obtained in the reference example 11. Furthermore, it is evident that the polyester composition (P-12) obtained in the reference example 12 shows a lower impact strength value than the polyester composition (P-1) obtained in the example 1. Furthermore, because the copolymer (L-3) exists in a viscous solid state, mixing with polylactic acid is difficult. As a result of poor handling properties and problems with productivity, the reference example 12 was awarded an overall evaluation of Δ.

INDUSTRIAL APPLICABILITY

According to the present invention, during melting of a polyhydroxycarboxylic acid (A) and a polyester (B) with hydroxyl groups at both terminals, obtained by reacting a dicarboxylic acid and a diol, which represent the raw materials, no decrease in viscosity is observed even if the melt residence time is long, and moreover, a stable molding resin can be produced with no loss of the molecular weight characteristics of the raw materials, and the product molding resin shows levels of impact resistance, flexibility and biodegradability that are not achievable using conventional techniques.

In addition, by adding such a molding resin to a polylactic acid, a polyester composition can be provided that shows excellent flexibility, impact resistance and biodegradability, while maintaining a practical level of transparency. Accordingly, the present invention is extremely useful for industrial applications.

The invention claimed is:

1. A molding resin formed from a block copolymer comprising polyhydroxycarboxylic acid structural units (I), and polyester structural units (II) derived from a dicarboxylic acid and a diol, wherein
   a weight ratio (I)/(II) between said polyhydroxycarboxylic acid structural units (I) and said polyester structural units (II) is within a range from 95/5 to 10/90,
   said molding resin has a microphase separated structure in which one of either said polyhydroxycarboxylic acid structural units (I) or said polyester structural units (II) forms domains within a matrix formed by said other structural units,
   an average domain size of said domains is within a range from 0.08 to 5.0 μm,
   a weight average molecular weight of said molding resin is within a range from 10,000 to 400,000, and
   wherein when said molding resin is tested using a rotational rheometer, under measurement conditions including a frequency of 1 Hz and a temperature within a range from a melting point of said molding resin through to said melting point +50° C., then when a strain of said molding resin is varied from 1 through to 60%, a storage elastic modulus G'(M%) at a strain of M% (1<M≦60) is within a range from 90 to 100% of a value of a storage elastic modulus G'(1%) at a strain of 1%.

2. A production process for a molding resin according to claim 1, wherein a molten mixture of a polyhydroxycarboxylic acid (A) with a weight average molecular weight of 10,000 to 400,000, and a polyester (B) with hydroxyl groups at both terminals and with a weight average molecular weight of 10,000 to 200,000, obtained by reacting a dicarboxylic acid and a diol, is subjected to an esterification reaction in presence of an esterification catalyst (C) and under conditions of reduced pressure, and said esterification reaction is continued until a point where testing of said reaction product, using a rotational rheometer, under measurement conditions including a frequency of 1 Hz and a temperature within a range from a melting point of said molding resin through to said melting point +50° C., and when a strain of said resin is varied from 1 through to 60%, results in a storage elastic modulus G'(M%) at a strain of M% (1<M 60) that is within a range from 90 to 100% of a value of a storage elastic modulus G'(1%) at a strain of 1%.

3. A production process for a molding resin according to claim 2, wherein said polyhydroxycarboxylic acid (A) is a material in which a polymerization catalyst contained within said polyhydroxycarboxylic acid (A) has been deactivated, and said polyester (B) is a material in which a polymerization catalyst (D) contained within said polyester (B) has been deactivated.

4. A production process for a molding resin according to claim 2, wherein said polyester (B) is either an aliphatic polyester obtained by reacting an aliphatic dicarboxylic acid and an aliphatic diol, or a polyester obtained by reacting a mixture of an aliphatic dicarboxylic acid and an aromatic dicarboxylic acid with an aliphatic diol.

5. A polyester composition comprising a molding resin according to claim 1, and a polylactic acid (E).

6. A polyester composition according to claim 5, wherein said molding resin comprises a weight ratio (I)/(II) between said polyhydroxycarboxylic acid structural units (I) and said polyester structural units (II) within a range from 20/80 to 70/30.

* * * * *